US012176824B2

(12) United States Patent
Shioura et al.

(10) Patent No.: US 12,176,824 B2
(45) Date of Patent: Dec. 24, 2024

(54) POWER CONVERSION DEVICE INCLUDING CURRENT RESPONSIVE CONTROL

(71) Applicant: Mitsubishi Electric Corporation, Tokyo (JP)

(72) Inventors: Kentaro Shioura, Tokyo (JP); Takeshi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/909,812

(22) PCT Filed: Mar. 26, 2020

(86) PCT No.: PCT/JP2020/013662
§ 371 (c)(1),
(2) Date: Sep. 7, 2022

(87) PCT Pub. No.: WO2021/192141
PCT Pub. Date: Sep. 30, 2021

(65) Prior Publication Data
US 2024/0204684 A1 Jun. 20, 2024

(51) Int. Cl.
*H02M 7/493* (2007.01)
*H02M 1/00* (2006.01)
*H02M 1/32* (2007.01)

(52) U.S. Cl.
CPC ......... *H02M 7/493* (2013.01); *H02M 1/0009* (2021.05); *H02M 1/32* (2013.01)

(58) Field of Classification Search
CPC ................................ H02M 7/493; H02M 1/32
See application file for complete search history.

(56) References Cited

U.S. PATENT DOCUMENTS 6,947,300 B2 * 9/2005 Pai ................. H02M 7/493
363/71

FOREIGN PATENT DOCUMENTS

JP        H0851791 A   *  2/1996   ............... H02P 7/83
JP        2010004645 A     1/2010
JP        2017046558 A     3/2017
(Continued)

OTHER PUBLICATIONS

A. G. Espinosa, J. R. R. Ruiz, J. Cusidóo, J. A. Ortega and L. Romeral, "Closed-Loop Controller for Eliminating the Contact Bounce in DC Core Contactors," in IEEE Transactions on Components and Packaging Technologies, vol. 33, No. 3, pp. 535-543, Sep. 2010, doi: 10.1109/TCAPT.2010.2041456. (Year: 2010).*

(Continued)

*Primary Examiner* — Peter M Novak
(74) *Attorney, Agent, or Firm* — Buchanan Ingersoll & Rooney PC

(57) ABSTRACT

A power conversion device includes power conversion units connected to a shared power source. The power conversion units each include a contactor, a power converter, and a unit controller. A contactor controller closes or opens the contactor. A sensor measures a value of at least one of input current or output current of the power converter. The unit controller determines presence or absence of a failure of the power conversion units based on the measured value of the sensor, and sends a determination result to another unit controller.

19 Claims, 13 Drawing Sheets

(56) References Cited

FOREIGN PATENT DOCUMENTS

JP          2017221058 A     12/2017

OTHER PUBLICATIONS

Lai, Jason. A Low-Cost Soft-Switched DC/DC Converter for Solid-Oxide Fuel Cells. United States: N. p., 2009. Web. doi: 10.2172/1005232. (Year: 2009).*
Machine translation of JPH0851791A by Aisaka. (Year: 1996).*
Office Action issued in corresponding Indian Patent Application No. 202227051437, mailed on Feb. 27, 2023, 5 pages.
International Search Report (PCT/ISA/210) with translation and Written Opinion (PCT/ISA/237) mailed on Jul. 7, 2020, by the Japan Patent Office as the International Searching Authority for International Application No. PCT/JP2020/013662. (8 pages).

* cited by examiner

POWER CONVERSION DEVICE INCLUDING CURRENT RESPONSIVE CONTROL

TECHNICAL FIELD

The present disclosure relates to a power conversion device.

BACKGROUND ART

Some electric railway vehicles are equipped with a power conversion device that converts electric power supplied from a substation via overhead lines into desired direct-current (DC) electric power or alternating-current (AC) electric power and supplies the DC electric power or the AC electric power to a load. One example of this type of power conversion device is disclosed in Patent Literature 1. This power conversion device includes two power converters and two filter capacitors. Each of the power converters converts DC electric power supplied via a primary terminal from a power source into AC electric power, and supplies the AC electric power to a load connected to a secondary terminal. Each of the filter capacitors is connected to the primary terminal of the corresponding power converter and is charged with electric power supplied by the power source. This power conversion device also includes a contactor that electrically connects the two power converters to the power source or disconnects the two power converters from the power source.

CITATION LIST

Patent Literature

Patent Literature 1: Unexamined Japanese Patent Application Publication No. 2017-221058

SUMMARY OF INVENTION

Technical Problem

The power converters of the power conversion device disclosed in Patent Literature 1 are provided with redundancy. Specifically, one of the power converters is set as an operation-system power converter and the other power converter is set as a standby-system power converter. More specifically, the power conversion device controls switching elements of the operation-system power converter to operate the operation-system power converter to convert the DC electric power into the AC electric power. In a case where the operation-system power converter fails, operation of the standby-system power converter enables continuation of the power conversion processing by the power conversion device.

However, the power converters of this power conversion device are redundant, while only a single contactor is provided. Thus failure of the contactor results in inability for the power conversion device to continue the power conversion processing. In other words, redundancy of this power conversion device is insufficient.

In view of the above circumstances, an objective of the present disclosure is to provide a power conversion device with high redundancy.

Solution to Problem

To achieve the above objective, a power conversion device of the present disclosure includes a plurality of power conversion units, a contactor controller, and a sensor. Each of the plurality of power conversion units includes a power converter, a contactor, and a unit controller. The power converter converts electric power supplied from a power source into electric power for supply to a load and supplies the converted electric power to the load. The contactor electrically connects the power converter to the power source or electrically disconnects the power converter from the power source. The unit controller controls switching elements included in the power converter. The plurality of power conversion unit is configured to be connected in common to the power source. The contactor controller closes or opens the contactor included in each of the plurality of power conversion units. The sensor measures a value of at least one of input current or output current of the power converter included in each of the plurality of power conversion units, and outputs the measured value of the at least one of the input current or the output current of the power converter. The unit controllers of the plurality of power conversion units are connected to one another through a transmission line. Each of the unit controllers determines presence or absence of a failure of the power conversion unit based on the measured value of the at least one of the input current or the output current of the power converter that is a control target and whether the contactor associated with the power converter that is the control target is in a closed state or an open state, and sends a determination result to another unit controller of the unit controllers.

Advantageous Effects of Invention

Since the power conversion device according to the present disclosure includes the plurality of power conversion units each including a power converter and a contactor and configured to be connected in common to the power source, the power conversion device with high redundancy can be provided.

DESCRIPTION OF EMBODIMENTS

Figure 1:
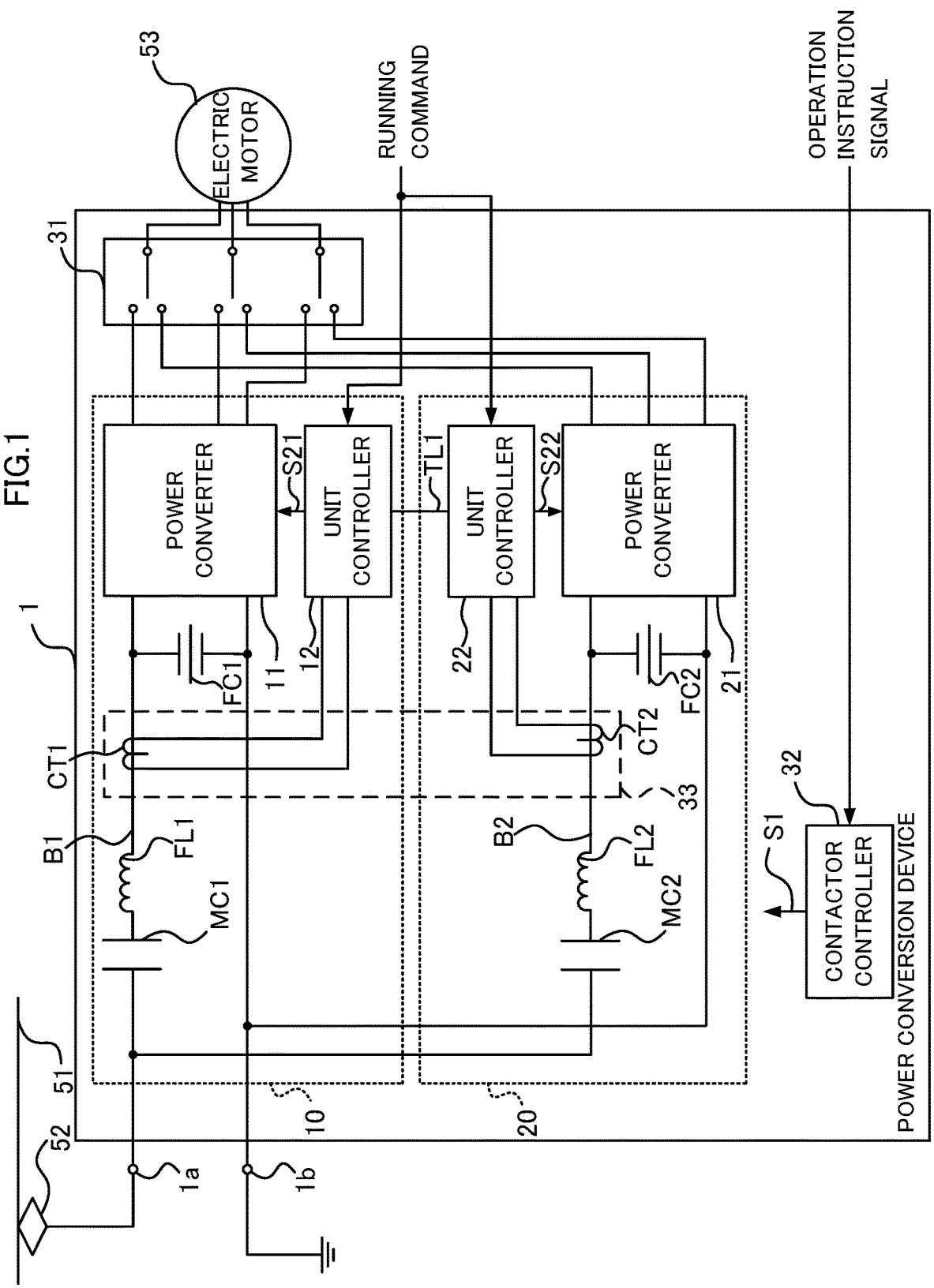
FIG. 1 is a block diagram of a power conversion device according to Embodiment 1.

A power conversion device according to embodiments of the present disclosure is hereinafter described in detail with reference to the drawings. The same reference numerals are used throughout the drawings to refer to the same or equivalent components.

Embodiment 1

A power conversion device 1 according to Embodiment 1 is described using as an example a power conversion device to be mounted on a vehicle, specifically, a power conversion device mounted on a DC feeding system of an electric railway vehicle. The power conversion device 1 illustrated in FIG. 1 converts DC electric power supplied from a power source into electric power for supply to a load and supplies the electric power to the load. In Embodiment 1, a current collector 52 that acquires electric power via an overhead line 51 from a substation corresponds to the power source. The current collector 52 is, for example, a pantograph. An electric motor 53 that receives supply of the electric power from the power conversion device 1 to operate and generates propulsion of the electric railway vehicle corresponds to the load. The electric motor 53 is, for example, a three-phase induction motor. Specifically, the power conversion device 1 converts DC electric power supplied from the current collector 52 into electric power for supply to the electric motor 53, for example, three-phase AC electric power, and supplies the three-phase AC electric power to the electric motor 53.

The power conversion device 1 includes a plurality of power conversion units 10 and 20 to enhance redundancy. One of the power conversion units 10 and 20 is set as an operation-system unit and the other one of the power conversion units 10 and 20 is set as a standby-system unit. The power conversion units 10 and 20 are connected in common to the current collector 52. The power conversion units 10 and 20 are connected in common to the electric motor 53 via a later-described switcher 31.

For example, the power conversion unit 10 is set as an operation-system unit and the power conversion unit 20 is set as a standby-system unit. In this case, the power conversion unit 10 converts DC electric power supplied from the current collector 52 into three-phase AC electric power and supplies the three-phase AC electric power to the electric motor 53. While the power conversion unit 10 performs power conversion processing, the power conversion unit 20 does not perform power conversion processing. Upon occurrence of a failure of the power conversion unit 10, the power conversion unit 20 is set as the operation-system unit so that the power conversion unit 20 then starts power conversion processing. Specifically, the power conversion unit 20 converts DC electric power supplied from the current collector 52 into three-phase AC electric power and supplies the three-phase AC electric power to the electric motor 53.

A configuration of the power conversion device 1 is described below. The power conversion device 1 includes a positive input terminal 1a connected to the current collector 52 and a negative input terminal 1b connected to the ground. The power conversion units 10 and 20 receive supply of DC electric power via the positive input terminal 1a from the current collector 52, converts the DC electric power into three-phase AC electric power, and supplies the three-phase AC electric power to the electric motor 53.

The power conversion unit 10 includes a power converter 11 that converts the DC electric power supplied via a primary terminal from the current collector 52 into the three-phase AC electric power for supply to the electric motor 53, and supplies the three-phase AC electric power through secondary terminals to the electric motor 53, a contactor MC1 that electrically connects the power converter 11 to the current collector 52 or electrically disconnects the power converter 11 from the current collector 52, and a unit controller 12 that controls switching elements included in the power convertor 11.

Preferably, the power conversion unit 10 further includes a filter capacitor FC1 connected between the primary terminals of the power converter 11 and a filter reactor FL1 that, together with the filter capacitor FC1, forms a filter for reducing harmonics.

The power conversion unit 20 includes a power converter 21 that converts the DC electric power supplied via the primary terminal from the current collector 52 into the three-phase AC electric power for supply to the electric motor 53, and supplies the three-phase AC electric power through the secondary terminals to the electric motor 53, a contactor MC2 that electrically connects the power converter 21 to the current collector 52 or electrically disconnects the power converter 21 from the current collector 52, and a unit controller 22 that controls switching elements included in the power convertor 21.

Preferably, the power conversion unit 20 further includes a filter capacitor FC2 connected between the primary terminals of the power converter 21 and a filter reactor FL2 that, together with the filter capacitor FC2, forms a filter for reducing harmonics.

The power conversion device 1 includes the switcher 31 that electrically connects either of the power conversion units 10 and 20 to the electric motor 53, a contactor controller 32 that controls the switcher 31 to close or open the contactors MC1 and MC2 included in the power conversion units 10 and 20, respectively, and a sensor 33 that measures at least one of values of input current and output current of each of the power converters 11 and 21 and outputs the measured value. Here, the input current of the power converter 11 indicates current that flows in the power converter 11 via the primary terminal of the power converter 11 or current that flows out from the power converter 11 via the primary terminal of the power converter 11. Similarly, the input current of the power converter 21 indicates current that flows in the power converter 21 via the primary terminal of the power converter 21 or current that flows out from the power converter 21 via the primary terminal of the power converter 21. Also, the output current of the power converter 11 indicates current that flows out from the power converter 11 via the secondary terminal of the power converter 11 or current that flows in the power converter 11 via the secondary terminal of the power converter 11. Similarly, the output current of the power converter 21 indicates current that flows out from the power converter 21 via the secondary terminal of the power converter 21 or current that flows in the power converter 21 via the secondary terminal of the power converter 21.

In Embodiment 1, the sensor 33 measures a value of the input current of each of the power converters 11 and 21. Specifically, the sensor 33 includes an input current sensor CT1 that measures a value of the input current of the power converter 11, specifically, a value of current flowing in an input busbar B1 connecting the filter reactor FL1 and the power converter 11 and outputs the measured value. The sensor 33 also includes an input current sensor CT2 that measures a value of the input current of the power converter 21, specifically, a value of current flowing in an input busbar B2 connecting the filter reactor FL2 and the power converter 21 and outputs the measured value.

Each component of the power conversion device 1 is described in detail. The positive input terminal 1a is connected to the current collector 52, which is the power source. The negative input terminal 1b is grounded via, for example, a ground brush, a wheel, and a rail.

Each component of the power conversion unit 10 is described. The contactor MC1 has one end connected to the positive input terminal 1a and the other end connected to one end of the filter reactor FL1. The contactor MC1 is a DC electromagnetic contactor and is controlled by the contactor controller 32. Specifically, the contactor MC1 is closed or opened by a contactor control signal S1 output by the contactor controller 32.

Upon the contactor controller 32 closing the contactor MC1, the one end and the other end of the contactor MC1 are connected to each other. As a result, the power converter 11 and the filter capacitor FC1 are electrically connected to the current collector 52 via the filter reactor FL1, and receive supply of the electric power from the current collector 52. Also, upon the contactor controller 32 opening the contactor MC1, the one end and the other end of the contactor MC1 are isolated from each other. As a result, the power converter 11 and the filter capacitor FC1 are electrically disconnected from the current collector 52 and cannot receive supply of the electric power from the current collector 52.

The one end of the filter reactor FL1 is connected to the other end of the contactor MC1, and the other end of the filter reactor FL1 is connected to one of the primary terminals of the power converter 11 and one end of the filter capacitor FC1. The filter capacitor FC1 is connected between the primary terminals of the power converter 11 and charged by the electric power supplied from the current collector 52. Specifically, the one end of the filter capacitor FC1 is connected to a point of connection between the other end of the filter reactor FL1 and the one of the primary terminals of the power converter 11. The other end of the filter capacitor FC1 is connected to a point of connection between the negative input terminal 1b and the other one of the primary terminals of the power converter 11. The filter reactor FL1 and the filter capacitor FC1 form a filter that reduces harmonics.

The power converter 11 converts the DC electric power supplied via the primary terminal into the three-phase AC electric power and supplies the three-phase AC electric power from each secondary terminal via the switcher 31 to the electric motor 53. For example, the power converter 11 is a variable voltage variable frequency (VVVF) inverter. Specifically, the power converter 11 includes a plurality of switching elements capable of high-speed switching, for example, insulated gate bipolar transistors (IGBTs). As described later, the plurality of switching elements is controlled by the unit controller 12 to turn on and off repeatedly, so that the power converter 11 converts the DC electric power into the three-phase AC electric power. Then the power converter 11 supplies the three-phase electric power via the switcher 31 to the electric motor 53.

The unit controller 12 acquires a running command from a master controller provided in an unillustrated driver's cab. The running command includes a powering command indicating a target acceleration of the electric railway vehicle, a brake command indicating a target deceleration of the electric railway vehicle, and the like.

The unit controller 12 sends, in accordance with the running command, switching control signals S21 to the switching elements included in the power converter 11 to control the switching elements. The unit controller 12 receives supply of the electric power from an unillustrated control power source and operates.

The unit controller 12 determines presence or absence of a failure of the power conversion unit 10 based on the at least one of the values of the input current and the output current of the power converter 11 that is a control target and whether the contactor MC1 associated with the power converter 11 is in a closed state or an open state. In Embodiment 1, the unit controller 12 acquires a value of the input current of the power converter 11 from the sensor 33. Specifically, the unit controller 12 acquires the measured value from the input current sensor CT1. The unit controller 12 acquires the contactor control signal S1 output by the contactor controller 32, and determines, based on the contactor control signal S1, whether the contactor MC1 is in the closed state or the open state.

Then the unit controller 12 determines presence or absence of a failure of the power conversion unit 10 based on the measured value of the input current sensor CT1 and whether the contactor MC1 is in the closed state or the open state.

Specifically, in a case where the contactor MC1 is in the closed state and the measured value of the input current sensor CT1 has an absolute value that is out of a first current range, the unit controller 12 determines that the failure of the power conversion unit 10 occurs. The first current range is determined in accordance with a value that current flowing through the overhead line 51 can have. For example, an upper limit value of the first current range is 1.5 times as much as a maximum value of the value that the current flowing through the overhead line 51 can have, and a lower limit value of the first current range is 0.5 times as much as a minimum value of the value that the current flowing through the overhead line 51 can have. Also, in a case where the contactor MC1 is in the open state and the measured value of the input current sensor CT1 has an absolute value that is out of a second current range, the unit controller 12 determines that the failure of the power conversion unit 10 occurs. The second current range is a sufficiently narrow range having a lower limit value that is zero amps.

Upon determination of the presence or absence of the failure of the power conversion unit 10 as described above, the unit controller 12 sends a determination result to another unit controller, that is, the unit controller 22. Then the unit controller 12 sends the determination result to the contactor controller 32.

Next, each component of the power conversion unit 20 is described. The contactor MC2 has one end connected to the positive input terminal 1a and the other end connected to one end of the filter reactor FL2. The contactor MC2 is a DC electromagnetic contactor and is controlled by the contactor controller 32. Specifically, the contactor MC2 is closed or opened by the contactor control signal S1 output by the contactor controller 32.

Upon the contactor controller 32 closing the contactor MC2, the one end and the other end of the contactor MC2 are connected to each other. As a result, the power converter 21 and the filter capacitor FC2 are electrically connected to the current collector 52 via the filter reactor FL2 and receive supply of the electric power from the current collector 52. Also, upon the contactor controller 32 opening the contactor MC2, the one end and the other end of the contactor MC2 are isolated from each other. As a result, the power converter 21 and the filter capacitor FC2 are electrically disconnected from the current collector 52 and cannot receive supply of the electric power from the current collector 52.

The one end of the filter reactor FL2 is connected to the other end of the contactor MC2, and the other end of the filter reactor FL2 is connected to one of the primary terminals of the power converter 21 and one end of the filter capacitor FC2. The filter capacitor FC2 is connected between the primary terminals of the power converter 21 and charged by the electric power supplied from the current collector 52. Specifically, the one end of the filter capacitor FC2 is connected to a point of connection between the other end of the filter reactor FL2 and one of the primary terminals of the power converter 21. The other end of the filter capacitor FC2 is connected to a point of connection between the negative input terminal 1b and the other one of the primary terminals of the power converter 21. The filter reactor FL2 and the filter capacitor FC2 form a filter that reduces harmonics.

The power converter 21 converts the DC electric power supplied via the primary terminal into the three-phase AC electric power and supplies the three-phase AC electric power from each secondary terminal via the switcher 31 to the electric motor 53. For example, the power converter 21 is a VVVF inverter. Specifically, the power converter 21 includes a plurality of switching elements capable of high-speed switching, for example, IGBTs. As described later, the plurality of switching elements is controlled by the unit controller 22 to turn on and off repeatedly, and thereby the power converter 21 converts the DC electric power into the three-phase AC electric power. Then the power converter 21 supplies the three-phase AC electric power via the switcher 31 to the electric motor 53.

The unit controller 22 acquires a running command from a master controller provided in an unillustrated driver's cab. The unit controller 22 sends, in accordance with the running command, switching control signals S22 to the switching elements included in the power converter 21 to control the switching elements. The unit controller 22 receives supply of the electric power from an unillustrated control power source and operates.

The unit controller 22 determines presence or absence of a failure of the power conversion unit 20 based on the at least one of the values of the input current and the output current of the power converter 21 that is a control target and whether the contactor MC2 associated with the power converter 21 is in the closed state or the open state. In Embodiment 1, the unit controller 22 acquires a value of the input current of the power converter 21 from the sensor 33. Specifically, the unit controller 22 acquires the measured value from the input current sensor CT2. The unit controller 22 acquires the contactor control signal S1 output by the contactor controller 32, and determines, based on the contactor control signal S1, whether the contactor MC2 is in the closed state or the open state.

Then the unit controller 22 determines presence or absence of a failure of the power conversion unit 20 based on the measured value of the input current sensor CT2 and whether the contactor MC2 is in the closed state or the open state.

Specifically, in a case where the contactor MC2 is in the closed state and the measured value of the input current sensor CT2 has an absolute value that is out of the first current range, the unit controller 22 determines that the failure of the power conversion unit 20 occurs. Also, in a case where the contactor MC2 is in the open state and the measured value of the input current sensor CT2 has an absolute value that is out of the second current range, the unit controller 22 determines that the failure of the power conversion unit 20 occurs.

Upon determination of the presence or absence of the failure of the power conversion unit 20 as described above, the unit controller 22 sends a determination result to another unit controller, that is, the unit controller 12. Then the unit controller 22 sends the determination result to the contactor controller 32.

Each primary terminal of the switcher 31 is connected to its corresponding output terminal of the power conversion units 10 and 20, specifically, its corresponding secondary terminal of the power converter 11 and 21. Each secondary terminal of the switcher 31 is connected to the electric motor 53. The switcher 31 is controlled by the contactor controller 32 to electrically connect each primary terminal connected to the power converter 11 to its corresponding secondary terminal or electrically connect each primary terminal connected to the power converter 21 to its corresponding secondary terminal.

The contactor controller 32 closes or opens the contactors MC1 and MC2. The contactor controller 32 switches the switcher 31 to connect to an operation-system or standby-system unit. An operation instruction signal that provides instruction to start or stop the power conversion device 1 is supplied from an unillustrated driver's cab to the contactor controller 32. The contactor controller 32 previously holds information about which power conversion unit, 10 or 20, is set as an operation-system unit. Also, as described above, the determination result indicating the presence or absence of the failure of the power conversion unit 10 and 20 is sent from the unit controller 12 and 22 to the contactor controller 32, respectively.

Specifically, upon the operation instruction signal providing instruction for the start of the power conversion device 1 being supplied to the contactor controller 32 with both of the contactors MC1 and MC2 being in the open state, the contactor controller 32 outputs the contactor control signal S1 that instructs closing of the contactor MC1 to close the contactor MC1. The contactor controller 32 then switches the switcher 31 to connect to the operation-system unit, that is, electrically connects the secondary terminals of the power converter 11 to the electric motor 53. The contractor controller 32 outputs the contactor control signal S1 providing instruction for the opening of the contactor MC2 to maintain the contactor MC2 open. Then, upon supply of the operation instruction signal providing instruction for stoppage of the power conversion device 1, the contactor controller 32 opens the closed contactor MC1. As a result, the contactors MC1 and MC2 are both in the open state.

The contactor controller 32 opens the contactor MC1 upon receiving from the unit controller 12 the determination result indicating that the failure of the power conversion unit 10 occurs in a case where the contactor MC1 is closed and the switcher 31 is switched to connect to the operation-system unit. The contactor controller 32 then switches the switcher 31 to connect to the standby-system unit, that is, electrically connects the secondary terminals of the power converter 21 to the electric motor 53. Then, the contactor controller 32 outputs the contactor control signal S1 providing instruction for the contactor MC2 to close the contactor MC2.

As described above, the sensor 33 includes the input current sensor CT1 that measures the value of the current flowing in the input busbar B1 and outputs the measured value, and the input current sensor CT2 that measures the value of the current flowing in the input busbar B2 and outputs the measured value. The input current sensor CT1 operates by receiving supply of the electric power from the unit controller 12 and sends the measured value to the unit controller 12. The input current sensor CT2 operates by receiving supply of the electric power from the unit controller 22 and sends the measured value to the unit controller 22. Since the structures of the input current sensors CT1 and CT2 are the same, the description is given using just the input current sensor CT1.

Figure 2:
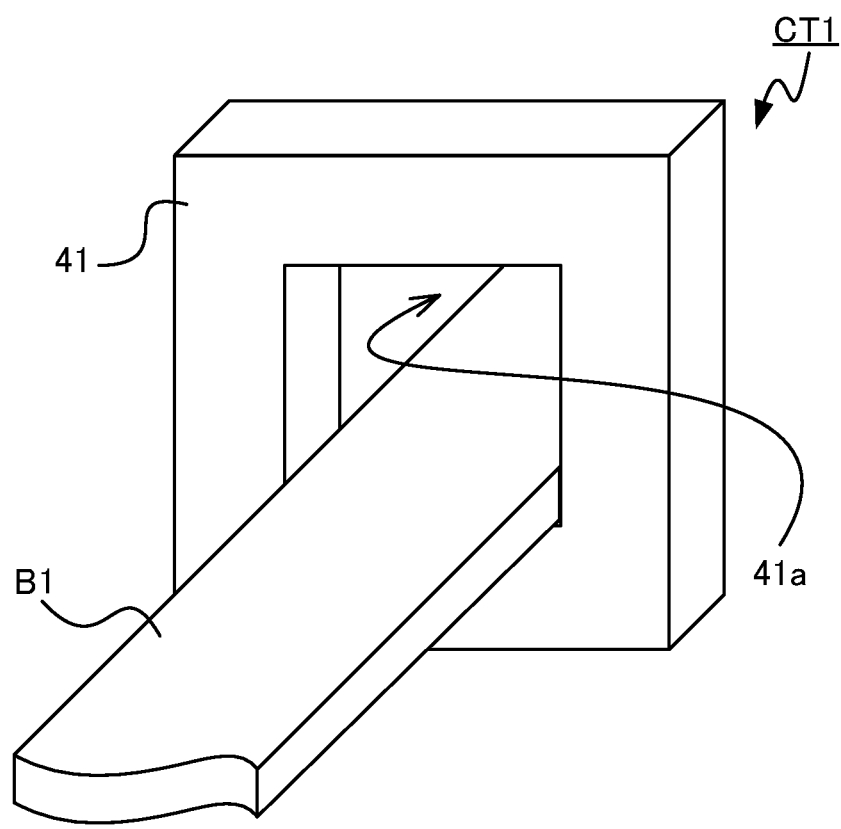
FIG. 2 is a perspective view of an input current sensor according to Embodiment 1.
Figure 3:
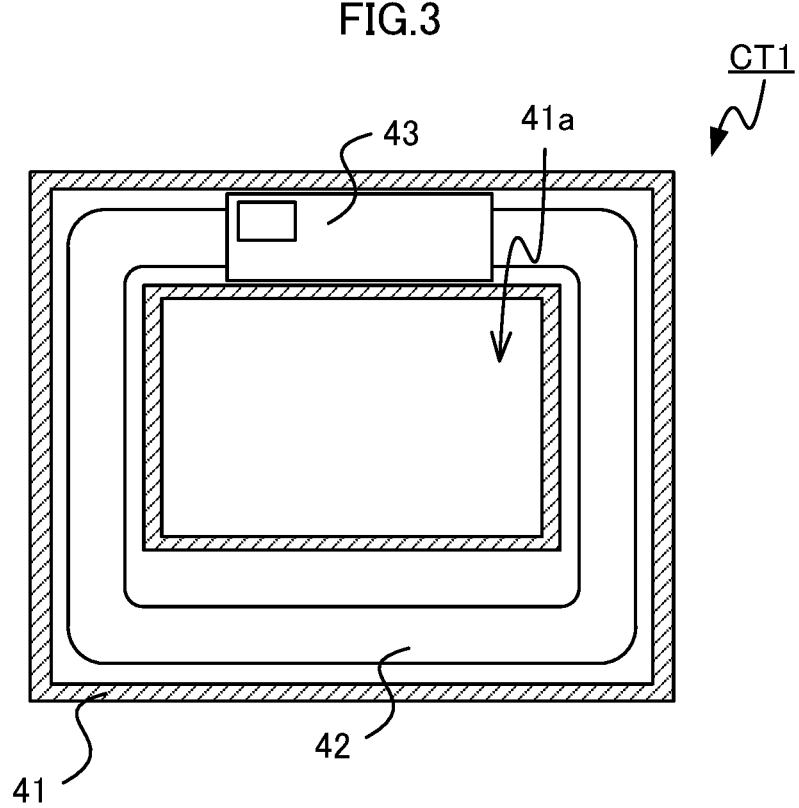
FIG. 3 is a cross-sectional view of the input current sensor according to Embodiment 1.

The input current sensor CT1 is a current transformer (CT) type of current sensor. Specifically, as illustrated in FIGS. 2 and 3, the input current sensor CT1 includes a first case 41, a first magnetic core 42, and a first measurement circuit 43 that measures current based on change in magnetic flux occurring in the first magnetic core 42.

The first case 41 has an annular shape with a through hole 41a in the center thereof. Here, the annular shape includes a polygonal shape having a through hole in the center and is not limited to a circular ring shape. The first case 41 is made of an insulator, for example, a synthetic resin. The first magnetic core 42 has an annular shape with a through hole in the center thereof. Upon current flowing into the input busbar B1, the magnetic flux of the first magnetic core 42 changes. The first measurement circuit 43 measures a value of current flowing in the input busbar B1 from the change of magnetic flux of the first magnetic core 42. Then the first measurement circuit 43 sends a signal indicating the measured value from an unillustrated output terminal to the unit controller 12.

The input current sensor CT1 having the above structure is attached to the input busbar B1 to which insulation is applied, with the input busbar B1 inserted through the through hole 41a in the center of the first case 41. Similarly, the input current sensor CT2 is attached to the input busbar B2 to which insulation is applied, with the input busbar B2 inserted through the through hole 41a in the center of the first case 41.

Next, operation of the power conversion device 1 having the above structure is described. First, a case where failure does not occur in the power conversion units 10 and 20 is described as an example. Upon contact of the current collector 52 with the overhead line 51 after operation of an upward movement switch for moving the current collector 52 upward at start of the electric railway vehicle, the current collector 52 receives supply of the electric power from a substation.

In conjunction with the operation of the upward movement switch, the operation instruction signal providing instruction for startup is supplied to the contactor controller 32. Upon supply of an open/close instruction signal providing the instruction for startup, the contactor controller 32 maintains the contactor MC2 in the open state and outputs the contactor control signal S1 providing instruction for closure of the contactor MC1. As a result, the contactor MC1 is closed and the contactor MC2 is maintained in the open state. Then the electric power acquired by the current collector 52 from the substation via the overhead line 51 is supplied to the filter capacitor FC1 via the contactor MC1 and the filter reactor FL1, and charging of the filter capacitor FC1 starts.

Upon start of operation after startup of the electric railway vehicle, the running command is input from a driver's cab to the unit controllers 12 and 22. The unit controllers 12 and 22 acquire values of voltage across the terminals of the filter capacitors FC1 and FC2 from an unillustrated voltage measurer, respectively. With the contactor MC1 closed and the contactor MC2 opened, only the filter capacitor FC1 is charged. Upon the value of the voltage across the terminals of the filter capacitor FC1 being equal to or greater than a threshold and the running command including a powering command, that is, at the powering time of the electric railway vehicle with the filter capacitor FC1 charged, the unit controller 12 controls the switching elements of the power converter 11 to cause the power converter 11 to convert the DC electric power into the three-phase AC electric power for driving the electric motor 53.

Specifically, the unit controller 12 calculates a target torque for acquiring a target acceleration indicated by the powering command. The unit controller 12 also acquires, from an unillustrated electric motor current measurer, a measured value of the current flowing in the electric motor 53, and calculates an actual torque of the electric motor 53 from the acquired measured value. Specifically, the unit controller 12 acquires, from the electric motor current measurer that measures values of U-phase, V-phase, and W-phase current flowing in the electric motor 53, measured values of phase current flowing in the electric motor 53, and calculates the actual torque of the electric motor 53 from the measured values of the phase current. Then, by sending the switching control signals S21 to the switching elements of the power converter 11, the unit controller 12 controls the switching elements to bring the actual torque of the electric motor 53 close to the target torque.

The unit controller 22 maintains the switching elements of the power converter 21 turned off since the contactor MC2 is opened and the filter capacitor FC2 is not charged.

In a case of the running command including the brake command, that is, at braking time of the electric railway vehicle, the electric motor 53 operates as an electric generator and supplies the three-phase AC electric power to the power converter 11. In this case, the unit controller 12 controls the switching elements of the power converter 11 to cause the power converter 11 to convert the three-phase AC electric power into the DC electric power. This enables the power conversion device 1 to supply electric power via the overhead line 51 to another electric railway vehicle located nearby. As a result, a regenerative braking force is generated in the electric railway vehicle and the electric railway vehicle decelerates.

Next, a case where a failure of the power conversion unit 10 occurs while the unit controller 12 controls the power converter 11 after the contactor MC1 is closed is used as an example to describe operation of the power conversion device 1 to switch from the operation-system unit to the standby-system unit.

For example, a case where input current of the power converter 11 is excessive in the power conversion unit 10 in a case of the running command including the powering command is used as an example to describe operation of the power conversion device 1. The unit controller 12 determines that a failure of the power conversion unit 10 occurs since the measured value of the input current sensor CT1 is excessive and out of the first current range. Then the unit controller 12 turns off the switching elements of the power converter 11. The unit controller 12 sends to the unit controller 22 and the contactor controller 32 the determination result indicating that the failure of the power conversion unit 10 occurs.

Upon the contactor controller 32 acquiring from the unit controller 12 the determination result that the failure of the power conversion unit 10 occurs in a case where the contactor MC1 is closed, the contactor controller 32 opens the contactor MC1. Then the contactor controller 32 controls the switcher 31 to electrically connect the secondary terminals of the power converter 21 to the electric motor 53. In other words, the switcher 31 switches to connect to the standby-system unit. Then the contactor controller 32 outputs the contactor control signal S1 providing instruction for closure of the contactor MC2 to close the contactor MC2.

Upon closing of the contactor MC2, the electric power acquired by the current collector 52 from the substation via the overhead line 51 is supplied to the filter capacitor FC2 via the contactor MC2 and the filter reactor FL2, and charging of the filter capacitor FC2 starts.

Upon acquiring from the unit controller 12 the determination result indicating that the failure of the power conversion unit 10 occurs, the unit controller 22 acquires the value of the voltage across the terminals of the filter capacitor FC2 from an unillustrated voltage measurer. Upon the value of the voltage across the terminals of the filter capacitor FC2 being equal to or greater than a threshold so that the running command is included in the powering command, that is, at the powering time of the electric railway vehicle with the filter capacitor FC2 charged, the unit controller 22 controls the switching elements of the power converter 21 to cause the power converter 21 to convert the DC electric power into the three-phase AC electric power for driving the electric motor 53.

Specifically, the unit controller 22 calculates a target torque for acquiring a target acceleration indicated by the powering command. The unit controller 22 also acquires, from an unillustrated electric motor current measurer, a measured value of the current flowing in the electric motor 53, and calculates an actual torque of the electric motor 53 from the acquired measured value. Specifically, the unit controller 22 acquires, from the electric motor current measurer that measures values of U-phase, V-phase, and W-phase current flowing in the electric motor 53, measured values of phase current flowing in the electric motor 53, and calculates the actual torque of the electric motor 53 from the measured values of the phase current. Then, by sending the switching control signals S22 to the switching elements of the power converter 21, the unit controller 22 controls the switching elements to bring the actual torque of the electric motor 53 close to the target torque.

The unit controller 12 maintains the switching elements of the power converter 11 turned off since the contactor MC1 is opened and the filter capacitor FC1 is not charged.

Upon acquiring from the unit controller 12 the determination result indicating that the failure of the power conversion unit 10 occurs in a case of the running command including the brake command, that is, at braking time of the electric railway vehicle, the unit controller 22 controls the switching elements of the power converter 21 to cause the power converter 21 to convert the three-phase AC electric power into the DC electric power. Similarly to the above-described example, the contactor controller 32 controls the switcher 31 to electrically connect the secondary terminals of the power converter 21 to the electric motor 53. This enables the power conversion device 1 to supply electric power via the overhead line 51 to another electric railway vehicle located nearby.

In this way, even with the failure of the power conversion unit 10 occurring, operation of the power conversion unit 20 enables continuous supply of the electric power to the electric motor 53 to drive the electric railway vehicle and occurrence of braking force in the electric railway vehicle by consuming the electric power generated in the electric motor 53.

Figure 4:
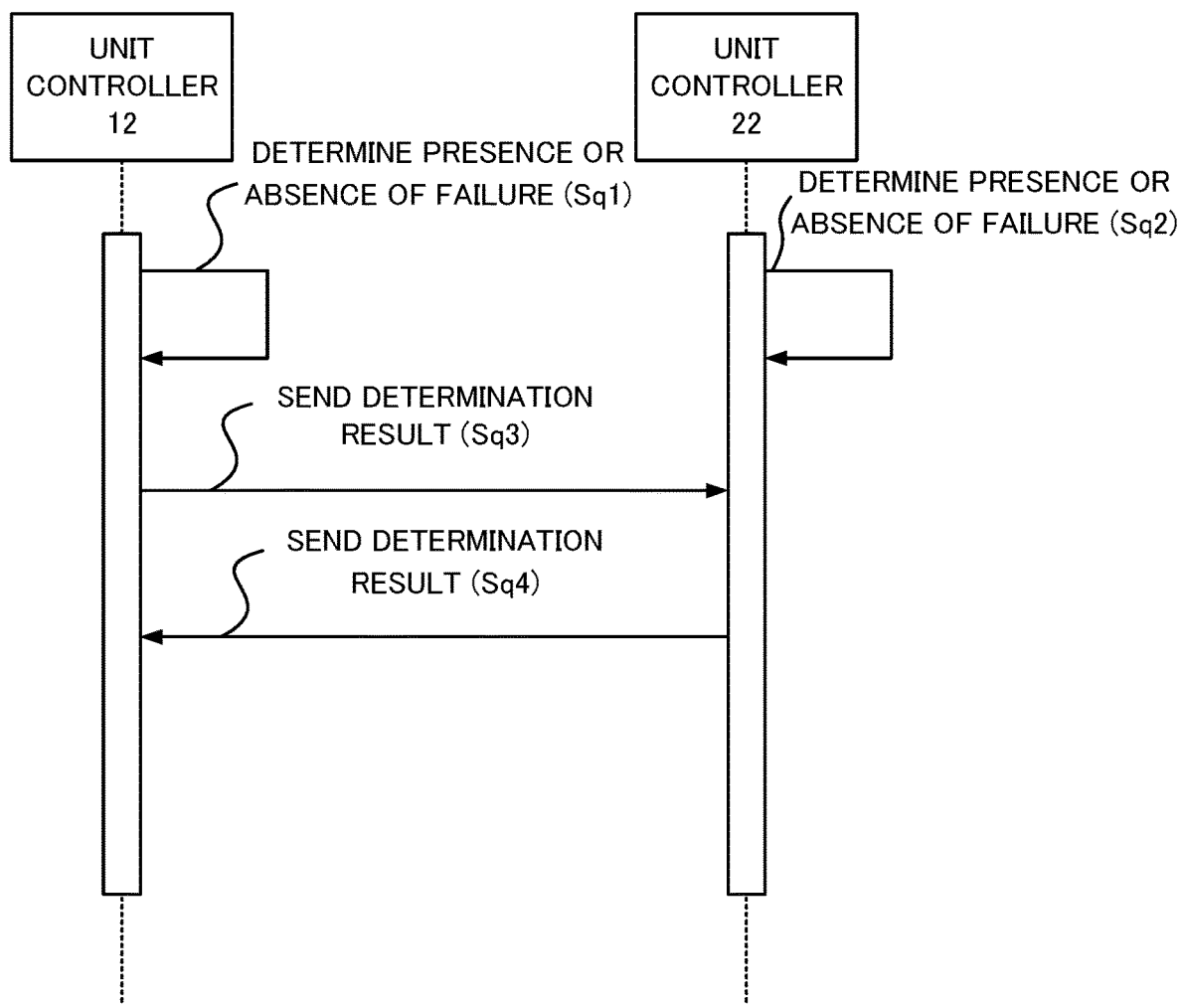
FIG. 4 is a sequence diagram illustrating communication between unit controllers according to Embodiment 1.

During the above-described operation of the power conversion device 1, the unit controllers 12 and 22 determine presence or absence of a failure of each of the power conversion units 10 and 20 at a determined interval, respectively, and send and receive the determination result. The sending and receiving of the determination report performed by the power conversion units 10 and 20 are described using FIG. 4.

As described above, the unit controller 12 determines the presence or absence of a failure of the power conversion unit 10 based on the measured value of the input current sensor CT1 and whether the contactor MC1 is in the closed state or the open state (Step Sq1).

Similarly, the unit controller 22 determines the presence or absence of a failure of the power conversion unit 20 based on the measured value of the input current sensor CT2 and whether the contactor MC2 is in the closed state or the open state (Step Sq2).

Then the unit controller 12 sends text data including the determination result in step Sq1 via a transmission line TL1 to the unit controller 22 (Step Sq3). For example, the unit controller 12 uses a transmission control character to transmit the text data including the determination result in step Sq1 to the unit controller 22 as one block.

The unit controller 22 having received the text data from the unit controller 12 sends the text data including the determination result in step Sq2 via the transmission line TL1 to the unit controller 12 (step Sq4). The unit controllers 12 and 22 repeat the above-described processing at a determined interval, for example, at a constant interval. The unit controllers 12 and 22 can thereby acquire information about the presence or absence of a failure of the respective power conversion units 10 and 20.

As described above, the power conversion device 1 according to Embodiment 1 includes the power conversion units 10 and 20, one of which is set as an operation-system unit and the other one of which is set as a standby-system unit. Specifically, the main circuit is redundant since the power conversion device 1 includes the contactor MC1, the filter reactor FL1, the filter capacitor FC1, and the power converter 11 of the power conversion unit 10, as well as the contactor MC2, the filter reactor FL2, the filter capacitor FC2, and the power converter 21 of the power conversion unit 20. Thus the power conversion device 1 has high redundancy.

Since the unit controllers 12 and 22 are connected to each other by the transmission line TL1, the number of wires can be less than a case where the unit controllers 12 and 22 are connected to each other by hard wiring, thereby reducing wiring work cost.

Embodiment 2

The sensor 33 has any configuration that can measure at least one of values of input current and output current of each of the power converters 11 and 21. A power conversion device 2 according to Embodiment 2 is hereinafter described mainly in terms of points of difference from the power conversion device 1 according to Embodiment 1.

Figure 5:
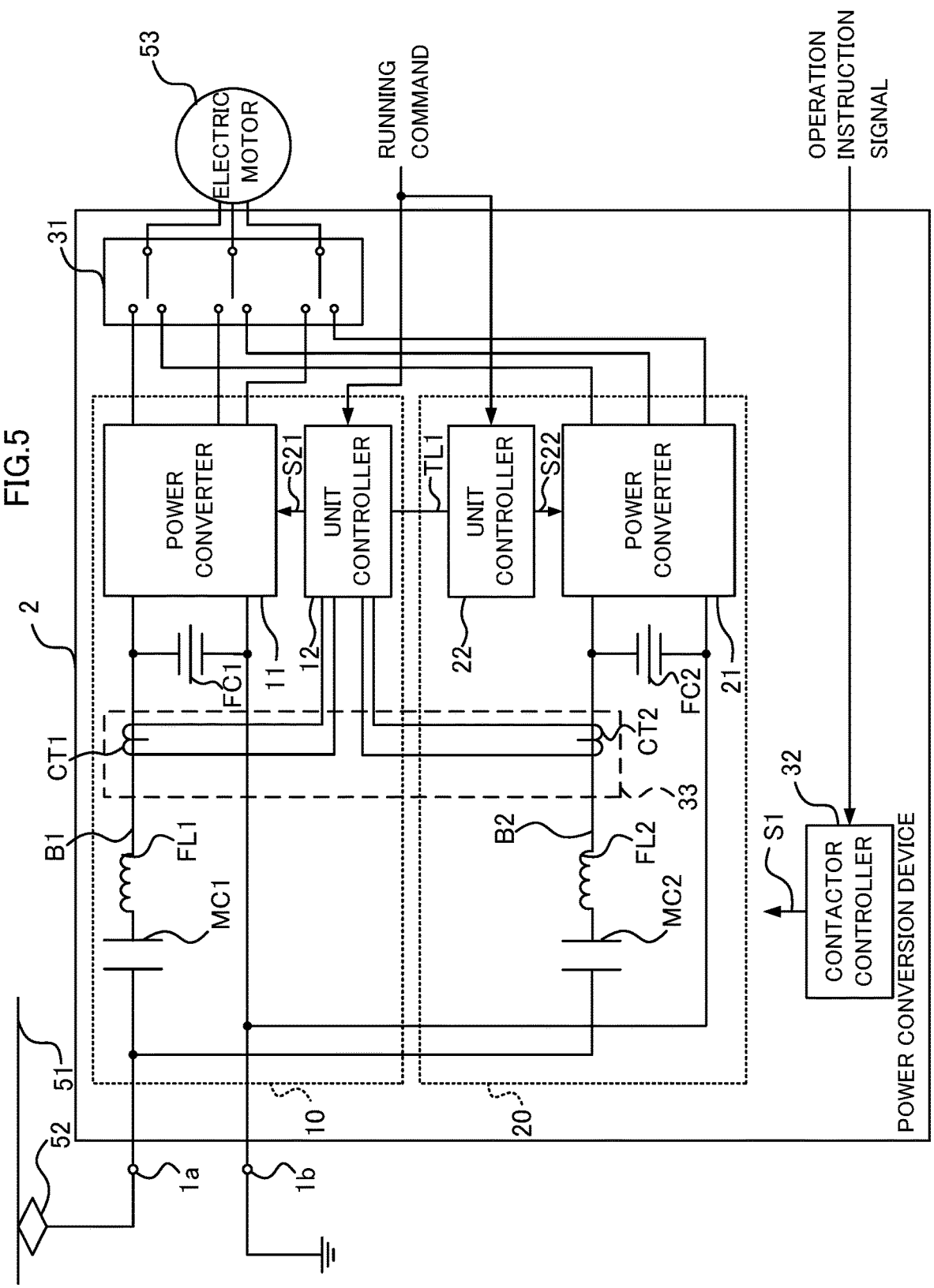
FIG. 5 is a block diagram of a power conversion device according to Embodiment 2.

The sensor 33 included in the power conversion device 2 illustrated in FIG. 5 includes the input current sensor CT1 that measures a value of input current of the power converter 11, specifically, a value of current flowing in the input busbar B1 connecting the filter reactor FL1 to the power converter 11. The sensor 33 includes the input current sensor CT2 that measures a value of input current of the power converter 21, specifically, a value of current flowing in the input busbar B2 connecting the filter reactor FL2 to the power converter 21.

The input current sensors CT1 and CT2 are both connected to the unit controller 12, and receives supply of electric power from the unit controller 12 and operates. Then the input current sensors CT1 and CT2 send the measured values of current to the unit controller 12.

The unit controller 12 determines presence or absence of a failure of the power conversion unit 10, similarly to Embodiment 1. The unit controller 12 analog-to-digital (A/D) converts the value of current acquired from the input current sensor CT2 and sends the converted value as text data via the transmission line TL1 to the unit controller 22. In other words, the unit controller 22 acquires the measured value of the input current sensor CT2 via the unit controller 12.

The unit controller 22 determines presence or absence of a failure of the power conversion unit 20 based on the measured value of the input current sensor CT2 acquired from the unit controller 12, similarly to Embodiment 1.

Figure 6:
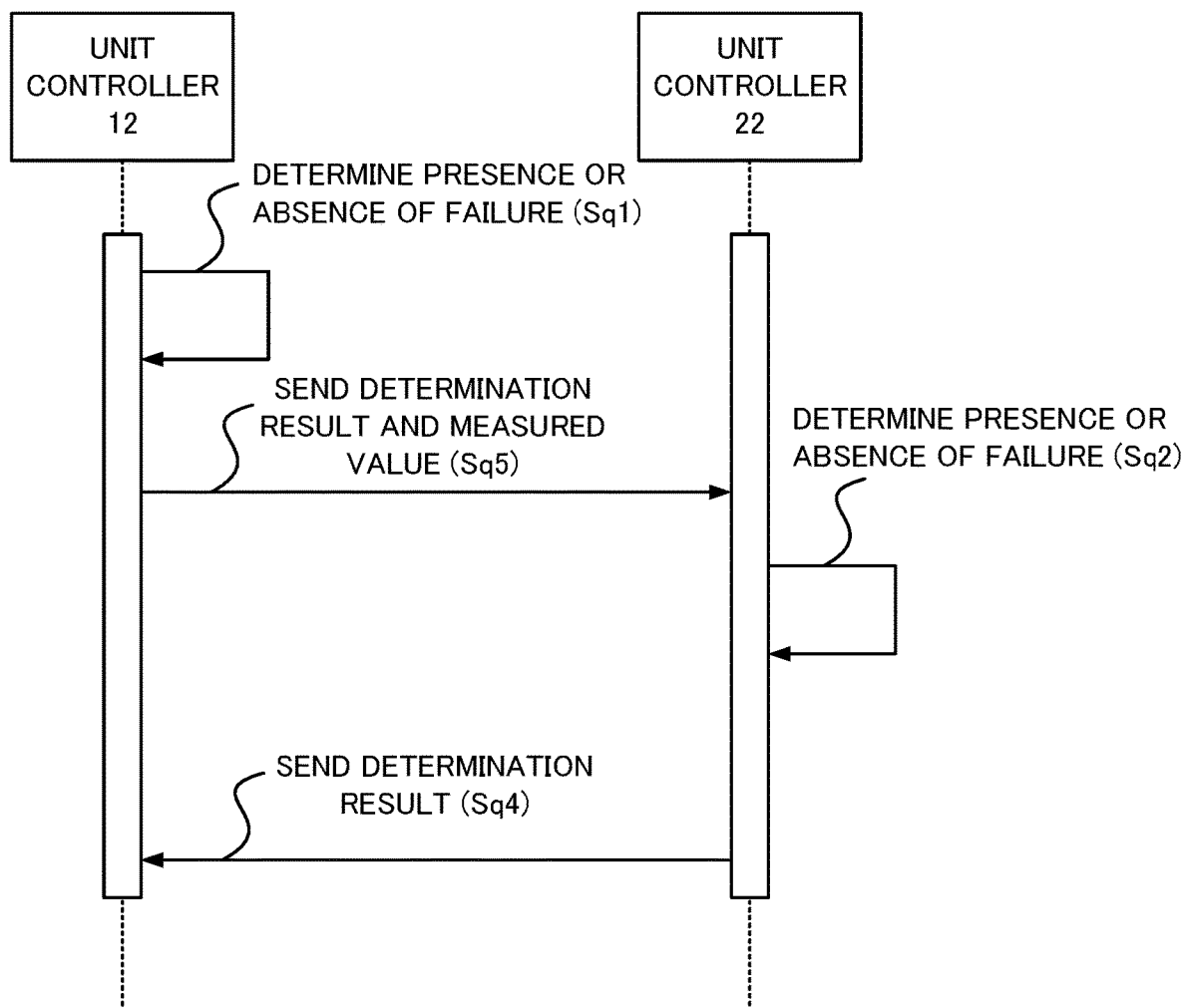
FIG. 6 is a sequence diagram illustrating communication between unit controllers according to Embodiment 2.

Specifically, as illustrated in FIG. 6, the unit controller 12 determines the presence or absence of a failure of the power conversion unit 10 based on the measured value of the input current sensor CT1 and whether the contactor MC1 is in the closed state or the open state (Step Sq1).

The unit controller 12 performs A/D conversion of the value of current acquired from the input current sensor CT2. Then the unit controller 12 sends via the transmission line TL1 to the unit controller 22 the text data including the determination result in step Sq1 and the measured value of the input current sensor CT2 (step Sq5). For example, the unit controller 12 uses a transmission control character to transmit to the unit controller 22 the text data including the determination result in step Sq1 and the measured value of the input current sensor CT2 by dividing the text data into a plurality of blocks.

The unit controller 22 having received the text data from the unit controller 12 determines presence or absence of a failure of the power conversion unit 20 based on the measured value of the input current sensor CT2 and whether the contactor MC2 is in the closed state or the open state (step Sq2).

Then the unit controller 22 sends via the transmission line TL1 to the unit controller 12 the text data including the determination result in step Sq2 (step Sq4). The unit controllers 12 and 22 repeat the above-described processing at a determined interval, for example, at a constant interval. The unit controllers 12 and 22 can thereby acquire information about the presence or absence of a failure of the respective power conversion units 10 and 20. The unit controller 22 can also acquire the measured value of the input current sensor CT2 via the unit controller 12.

As described above, in the power conversion device 2 according to Embodiment 2, both of the input current sensors CT1 and CT2 are connected to the unit controller 12. Thus, connecting only the unit controller 12 to each of the input current sensors CT1 and CT2 is sufficient. In other words, providing the unit controller 22 with an interface for connection of the input current sensor CT2 is unnecessary. This can achieve simple configuration of the unit controller 22.

Embodiment 3

The configuration of the sensor 33 is not limited to those of the examples of Embodiments 1 and 2. The sensor 33 included in a power conversion device 3 according to Embodiment 3 includes an input current sensor CT3 shared by the power conversion units 10 and 20. The power conversion device 3 is described below mainly in terms of points of difference from the power conversion device 1 according to Embodiment 1.

Figure 7:
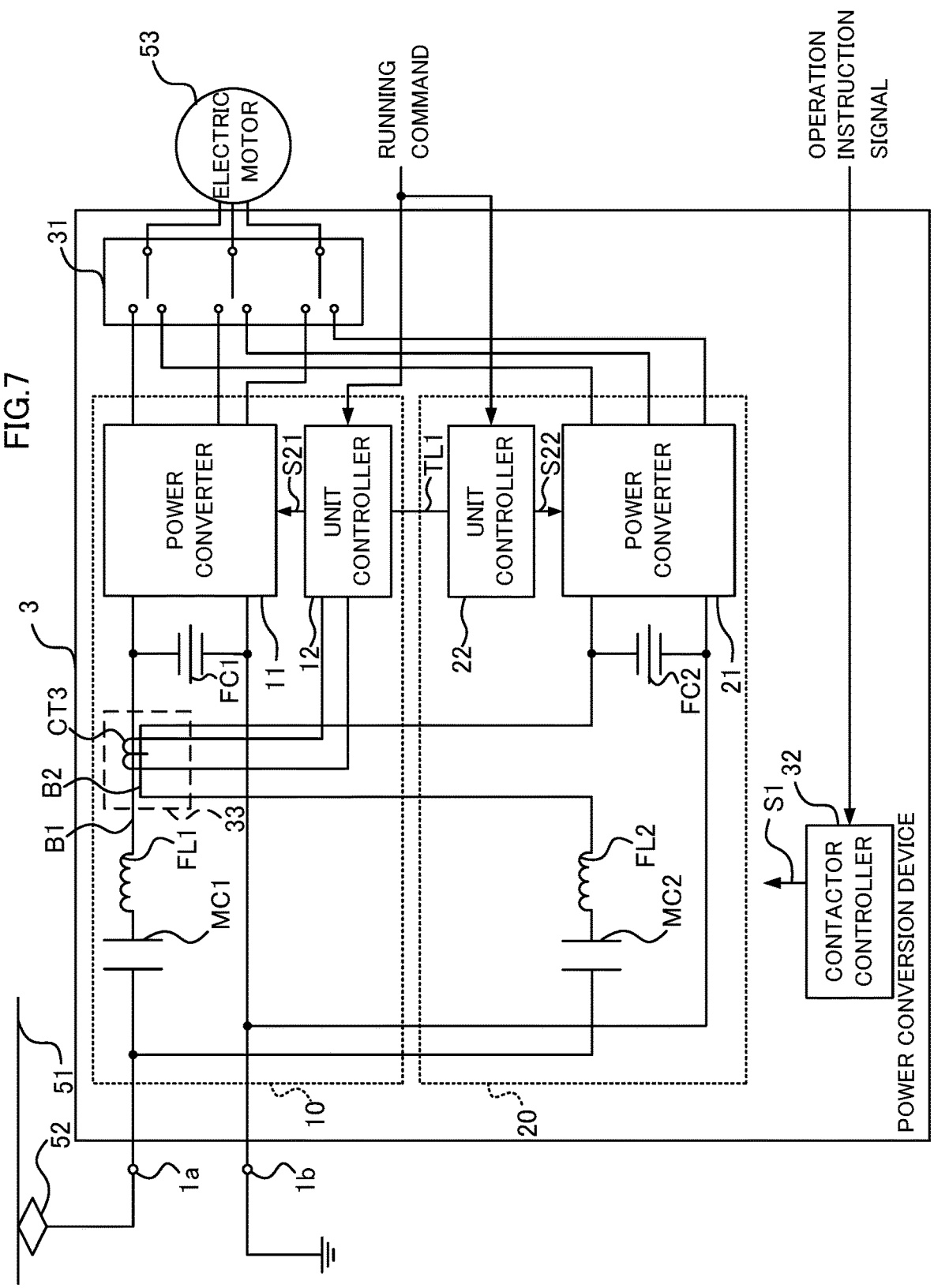
FIG. 7 is a block diagram of a power conversion device according to Embodiment 3.

The sensor 33 included in the power conversion device 3 according to Embodiment 3 illustrated in FIG. 7 includes the input current sensor CT3 that measures a value of input current of the power converter 11 or a value of input current of the power converter 21. The input current sensor CT3 measures a value of current flowing in the input busbar B1 connecting the filter reactor FL1 to the power converter 11 or a value of current flowing in the input busbar B2 connecting the filter reactor FL2 to the power converter 21. The input current sensor CT3 receives supply of electric power from the unit controller 12 and operates, and sends the measured value to the unit controller 12.

In the power conversion device 3, one of the power conversion units 10 and 20 is set as an operation-system unit and the other one is set as a standby-system unit. In other words, during operation of the power conversion device 3, current flows through either of the input busbar B1 or B2. Thus the value of the input current of the power converter 11 or the value of the input current of the power converter 21 can be measured by the input current sensor CT3 that is shared by the power conversion units 10 and 20.

With the contactor MC1 closed, the input current sensor CT3 measures the value of the input current of the power converter 11 of the power conversion unit 10 including the closed contactor MC1. Alternatively, with the contactor MC2 closed, the input current sensor CT3 measures the value of the input current of the power converter 21 of the power conversion unit 20 including the closed contactor MC2.

Figure 8:
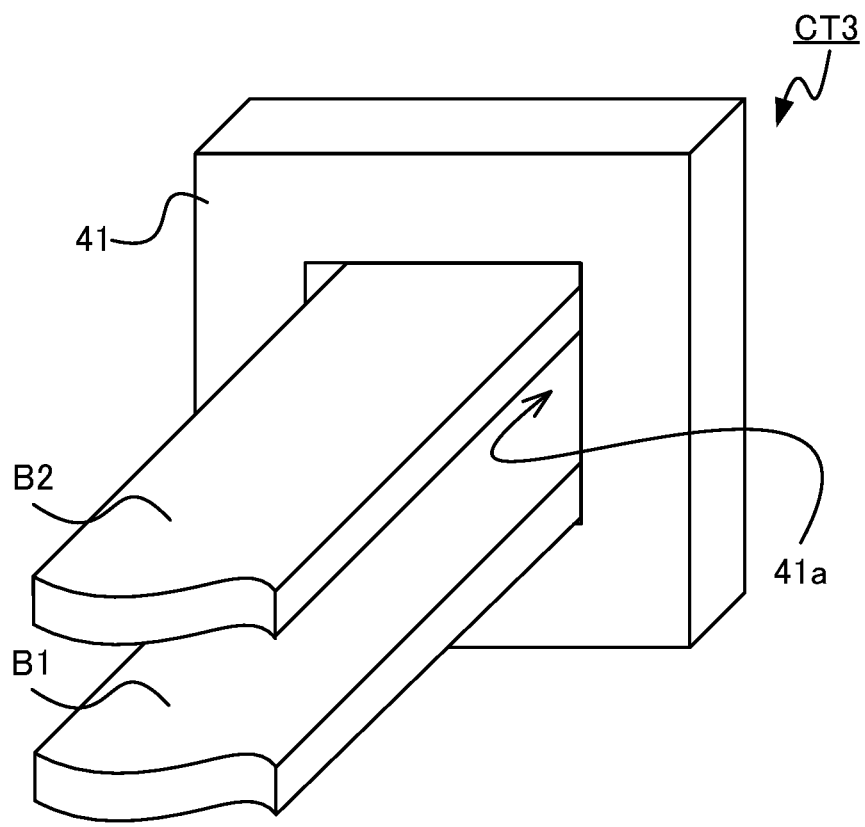
FIG. 8 is a perspective view of an input current sensor according to Embodiment 3.

The structure of the input current sensor CT3 is the same as the input current sensor CT1 according to Embodiment 1 except that, as illustrated in FIG. 8, the input busbars B1 and B2 are inserted through the through hole 41a of the first case 41 included in the input current sensor CT3. The input current sensor CT3 having the above structure is attached to at least one of the input busbars B1 and B2 to which insulation is applied, with the input busbars B1 and B2 inserted through the through hole 41a in the center of the first case 41.

Upon current flowing into either of the input busbars B1 or B2, the magnetic flux of the first magnetic core 42 changes. Similarly to Embodiment 1, the first measurement circuit 43 measures a value of current flowing in either of the input busbar B1 or B2 based on a change in magnetic flux of the first magnetic core 42. Then the first measurement circuit 43 sends a signal indicating a measured value to the unit controller 12 from an unillustrated output terminal.

In a case where the contactor MC1 is in the closed state and the measured value of the input current sensor CT3 has an absolute value that is out of the first current range, the unit controller 12 determines that the failure of the power conversion unit 10 occurs.

The unit controller 12 A/D converts the value of current acquired from the input current sensor CT3 and sends the converted value as text data via the transmission line TL1 to the unit controller 22. In other words, the unit controller 22 acquires the measured value of the input current sensor CT3 via the unit controller 12. Communication between the unit controllers 12 and 22 are similar to communication between the unit controllers 12 and 22 included in the power conversion device 2 according to Embodiment 2.

The unit controller 22 determines presence or absence of a failure of the power conversion unit 20 based on the measured value of the input current sensor CT3 acquired from the unit controller 12. Specifically, in a case where the contactor MC2 is the closed state and the measured value of the input current sensor CT3 has an absolute value that is out of the first current range, the unit controller 22 determines that the failure of the power conversion unit 20 occurs. The measured value of the input current sensor CT3 acquired by the unit controller 22 from the unit controller 12 with the contactor MC2 closed can be regarded as a value of the input current of the power converter 21.

As described above, the sensor 33 included in the power conversion device 3 according to Embodiment 3 includes the input current sensor CT3 that is shared by the power conversion units 10 and 20. In comparison to the case of providing the input current sensors CT1 and CT2 respectively corresponding to the power conversion unit 10 and 20 as in Embodiments 1 and 2, the configuration of the sensor 33 included in the power conversion device 3 according to Embodiment 3 is simple.

Embodiment 4

The sensor 33 may measure a value of output current of the power converter 11 or the power converter 21. The sensor 33 included in a power conversion device 4 according to Embodiment 4 measures values of the input current and the output current of the power converter 11 or values of the input current and the output current of the power converter 21. The power conversion device 4 is described below mainly in terms of points of difference from Embodiment 3.

Figure 9:
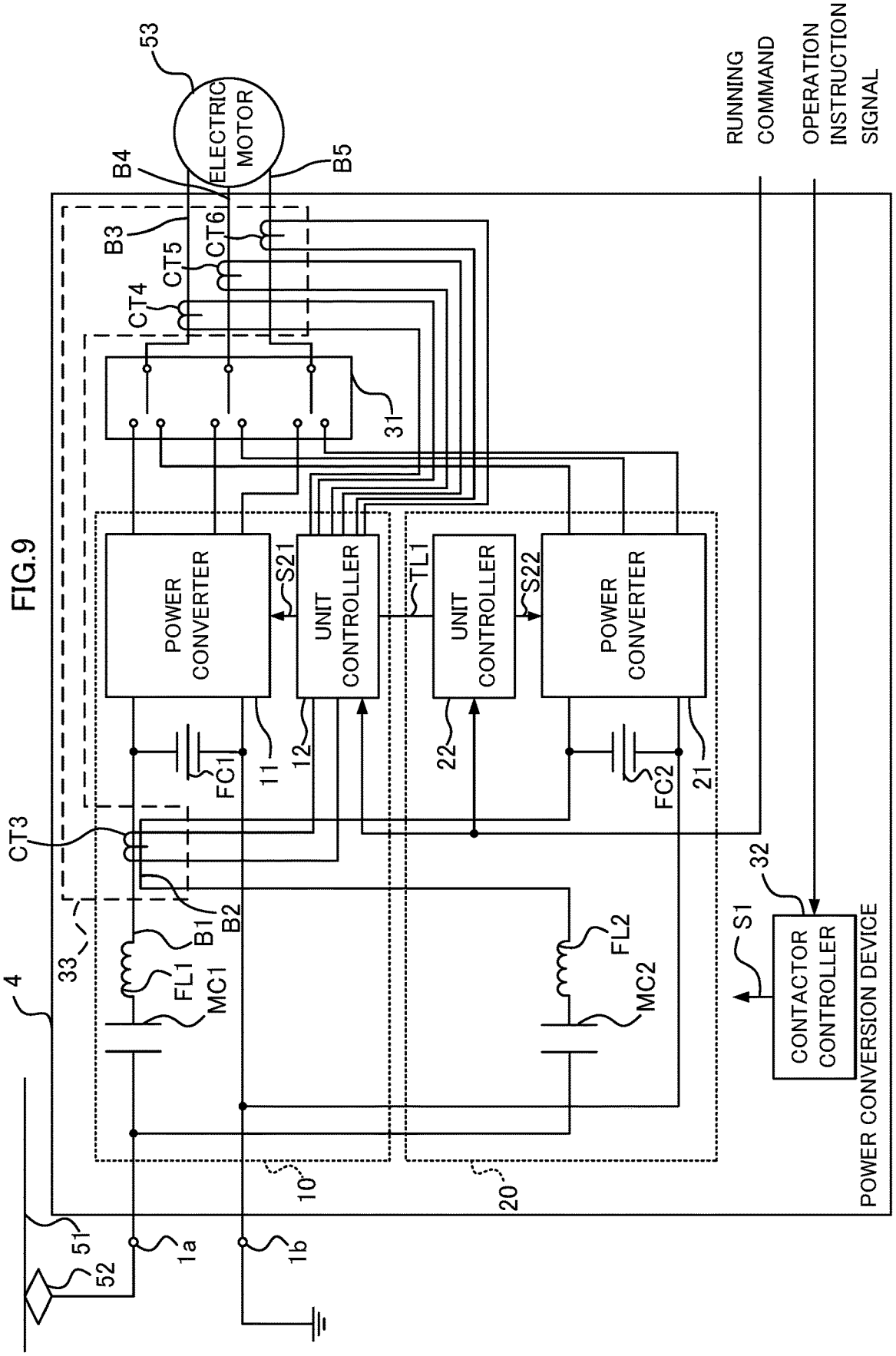
FIG. 9 is a block diagram of a power conversion device according to Embodiment 4.

As illustrated in FIG. 9, the secondary terminals of the switcher 31 included in the power conversion device 4 according to Embodiment 4 are connected to the electric motor 53 by output busbars B3, B4, and B5 corresponding to the U phase, the V phase, and the W phase, respectively. In other words, current flowing in the output busbars B3, B4, and B5 is respectively U-phase, V-phase, and W-phase current.

The sensor 33 included in the power conversion device 4 includes output current sensors CT4, CT5, and CT6 that measure values of output current of the power converter 11 or the power converter 21 and output the measured values, in addition to the configuration of the sensor 33 included in the power conversion device 3 according to Embodiment 3.

Specifically, the output current sensor CT4 measures a value of current flowing in the output busbar B3 connecting the switcher 31 to the electric motor 53 and outputs the measured value. The output current sensor CT5 measures a value of current flowing in the output busbar B4 connecting the switcher 31 to the electric motor 53 and outputs the measured value. The output current sensor CT6 measures a value of current flowing in the output busbar B5 connecting the switcher 31 to the electric motor 53 and outputs the measured value.

The output current sensors CT4, CT5, and CT6 operate by receiving power from the unit controller 12 and send the measured values to the unit controller 12. Since the structures of the output current sensors CT4, CT5, and CT6 are the same, description is given using just the output current sensor CT4.

Figure 10:
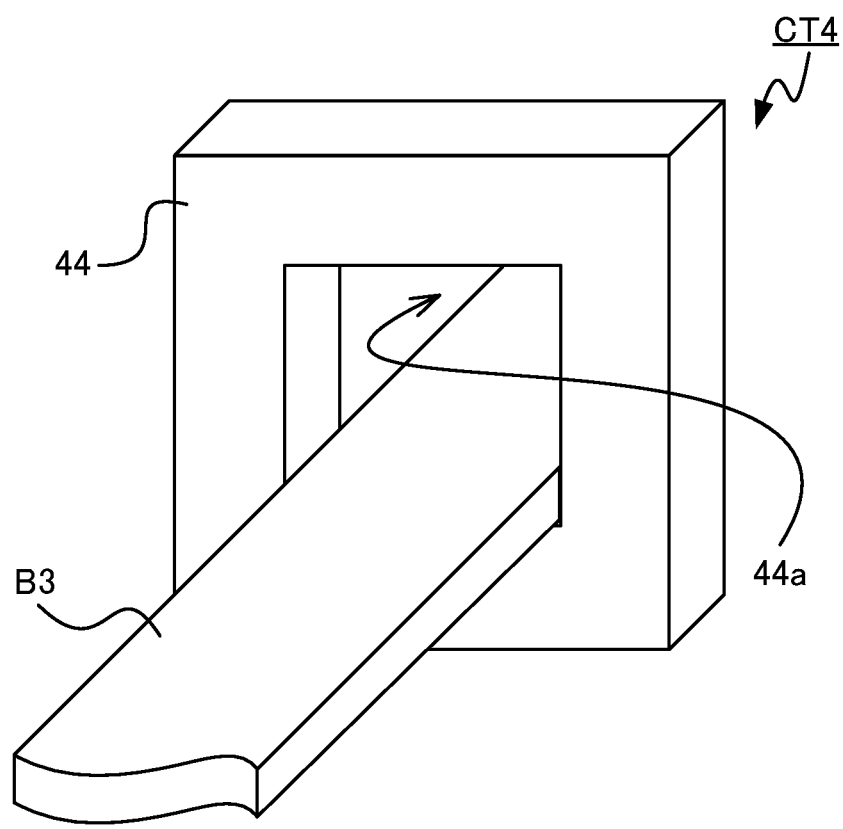
FIG. 10 is a perspective view of an output current sensor according to Embodiment 4.
Figure 11:
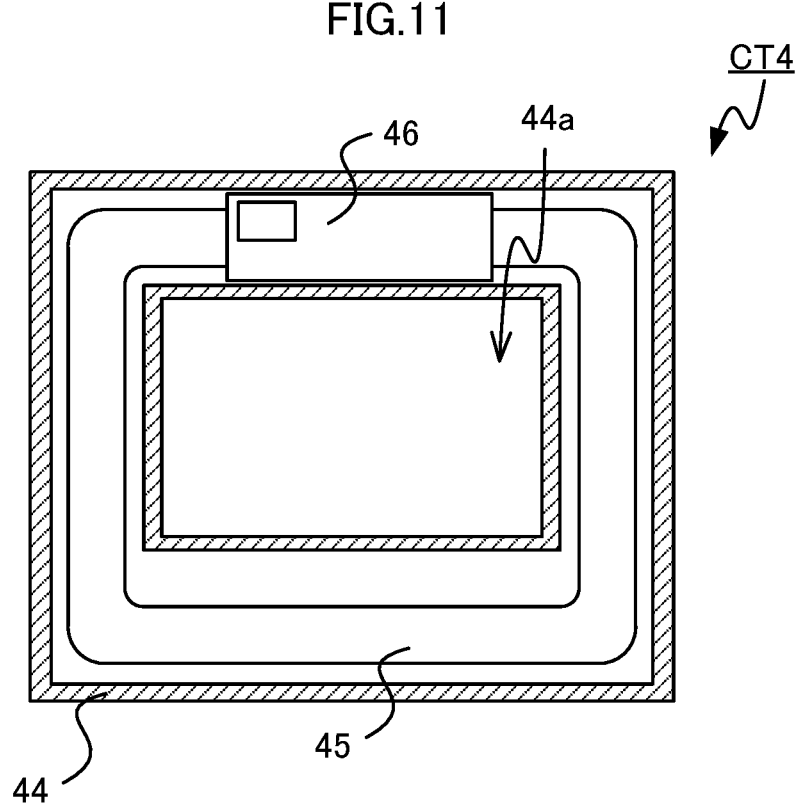
FIG. 11 is a cross-sectional diagram of the output current sensor according to Embodiment 4.

The output current sensor CT4 is a CT type of current sensor. Specifically, as illustrated in FIGS. 10 and 11, the output current sensor CT4 includes a second case 44, a second magnetic core 45, and a second measurement circuit 46 that measures current based on change in magnetic flux occurring in the second magnetic core 45.

The second case 44 has an annular shape with a through hole 44a in the center thereof. Here, the annular shape includes a polygonal shape having a through hole in the center and is not limited to a circular ring shape. The second case 44 is made of an insulator, for example, a synthetic resin. The second magnetic core 45 has an annular shape with a through hole in the center thereof. Upon current flowing into the output busbar B3, the magnetic flux of the second magnetic core 45 changes. The second measurement circuit 46 measures a value of current flowing in the output busbar B3 from the change of magnetic flux of the second magnetic core 45. Then the second measurement circuit 46 sends a signal indicating the measured value from an unillustrated output terminal of the output current sensor CT4 to the unit controller 12.

The output current sensor CT4 having the above structure is attached to the output busbar B3 to which insulation is applied, with the output busbar B3 inserted through the through hole 44a in the center of the second case 44. Similarly, the output current sensor CT5 is attached to the output busbar B4 to which insulation is applied, with the output busbar B4 inserted through the through hole 44a in the center of the second case 44. Similarly, the output current sensor CT6 is attached to the output busbar B5 to which insulation is applied, with the output busbar B5 inserted through the through hole 44a in the center of the second case 44.

The unit controller 12 determines presence or absence of a failure of the power conversion unit 10 based on the values of the input current and the output current of the power converter 11 that is a control target and whether the contactor MC1 associated with the power converter 11 is in the closed state or the open state. Specifically, the presence or absence of a failure of the power conversion unit 10 is determined based on the measured value of the input current sensor CT3 and the measured values of the output current sensors CT4, CT5, and CT6 and whether the contactor MC1 is in the closed state or the open state.

Specifically, in a case where, with the contactor MC1 closed, the measured value of the input current sensor CT3 has an absolute value that is out of a first current range or at least one of amplitudes of the measured values acquired from the output current sensors CT4, CT5, and CT6 is out of a first amplitude range, the unit controller 12 determines that the failure of the power conversion unit 10 occurs. The first amplitude range is determined in accordance with a value that the amplitude of each phase current of U-phase, V-phase, and W-phase current output by the power converter 11 or the power converter 21 can have. For example, an upper limit value of the first amplitude range is 1.5 times as much as a maximum value of the value that the amplitude of each phase current of the U-phase, V-phase, and W-phase current can have, and a lower limit value of the first current range is 0.5 times as much as a minimum value of the value that the amplitude of each phase current of the U-phase, V-phase, and W-phase current can have.

The unit controller 12 performs A/D conversion of the measured values acquired from the output current sensors CT4, CT5, and CT6. The unit controller 12 sends via the transmission line TL1 to the unit controller 22 the text data including the determination result in step Sq1, the measured value of the input current sensor CT3, and the measured values of the output current sensors CT4, CT5, and CT6, similarly to the processing illustrated in FIG. 6. In other words, the unit controller 22 acquires via the unit controller 12 the measured value of the input current sensor CT3 and the measured values of the output current sensors CT4, CT5, and CT6.

Tue unit controller 22 determines presence or absence of a failure of the power conversion unit 20 based on the measured value of the input current sensor CT3 acquired from the unit controller 12 and the measured values of the output current sensors CT4, CT5, and CT6 acquired from the unit controller 12. Specifically, in a case where the contactor MC2 is in the closed state and the measured value of the input current sensor CT3 has an absolute value that is out of the first current range or at least one of amplitudes of the measured values of the output current sensors CT4, CT5, and CT6 is out of the first amplitude range, the unit controller 22 determines that the failure of the power conversion unit 20 occurs.

The unit controller 12 calculates an actual torque of the electric motor 53 from the measured values of the output current sensors CT4, CT5, and CT6 at the powering time of the electric railway vehicle with the filter capacitor FC1 charged. Similarly, the unit controller 22 calculates an actual torque of the electric motor 53 from the measured values of the output current sensors CT4, CT5, and CT6 acquired from the unit controller 12 at the powering time of the electric railway vehicle with the filter capacitor FC2 charged.

As described above, in the power conversion device 4 according to Embodiment 4, the unit controllers 12 and 22 determine the presence or absence of a failure of the power conversion units 10 and 20, respectively, based on the measured value of the input current sensor CT3 and the measured values of the output current sensors CT4, CT5, and CT6. Thus the power conversion device 4 can determine the presence or absence of a failure of the power conversion units 10 and 20 with higher accuracy than the power conversion devices 1 to 3.

The unit controller 22 acquires the measured value of the input current sensor CT3 and the measured values of the output current sensors CT4, CT5, and CT6 from the unit controller 12. Thus connecting only the unit controller 12 to the input current sensor CT3 and the output current sensors CT4, CT5, and CT6 is sufficient. In other words, providing the unit controller 22 with an interface for connection to the input current sensor CT3 and the output current sensors CT4, CT5, and CT6 is unnecessary. This can achieve simple configuration of the unit controller 22.

Embodiment 5

A configuration of the sensor 33 that measures a value of output current of the power converter 11 or the power converter 21 is not limited to an example of Embodiment 4. The sensor 33 included in a power conversion device 5 according to Embodiment 5 includes output current sensors CT7, CT8, and CT9 that are shared by the power conversion units 10 and 20. The power conversion device 5 is described below mainly in terms of points of difference from that of Embodiment 4.

Figure 12:
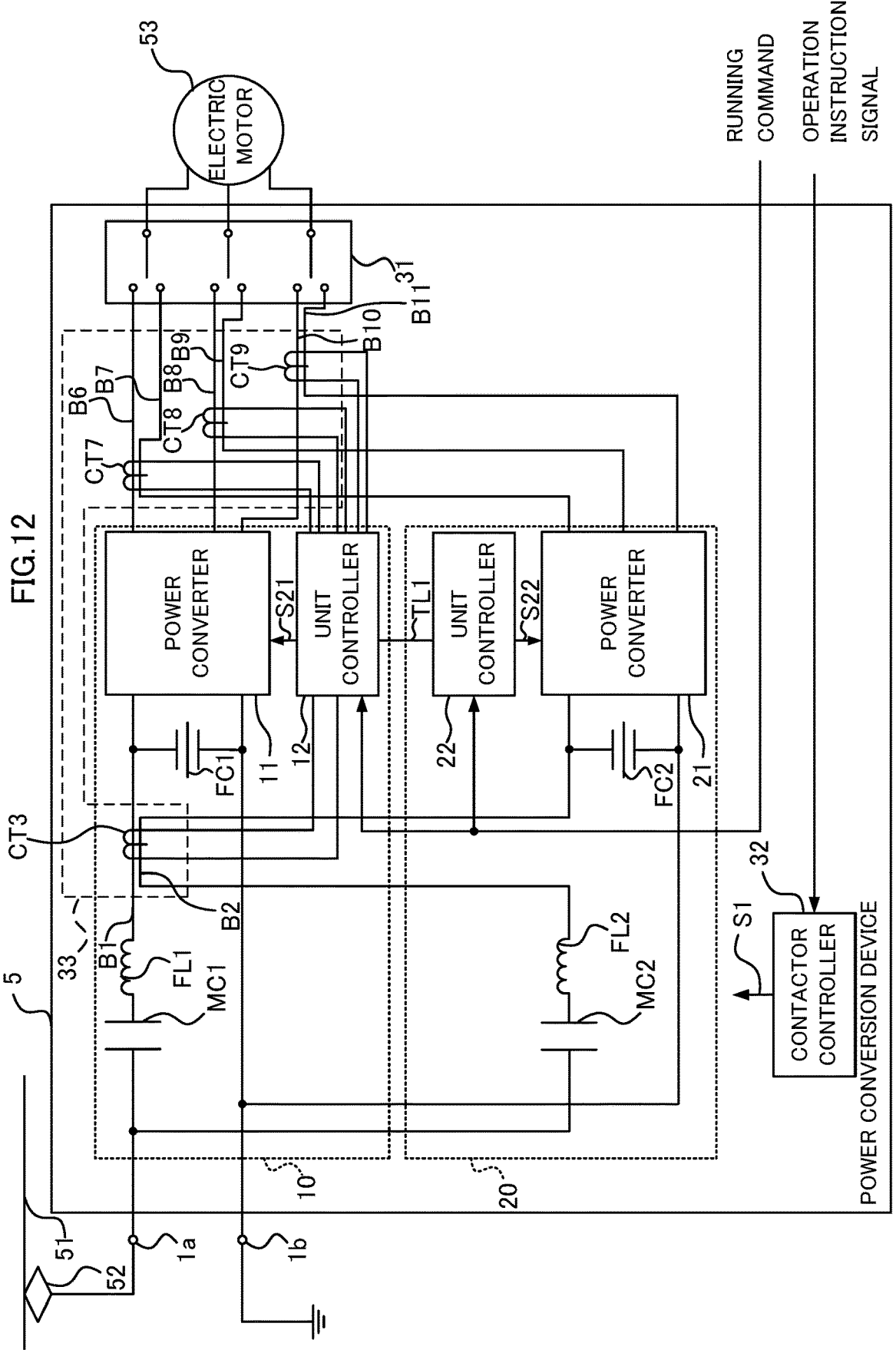
FIG. 12 is a block diagram of a power conversion device according to Embodiment 5.

As illustrated in FIG. 12, the secondary terminals corresponding to the respective U phases of the power converters 11 and 21 included in the power conversion device 5 according to Embodiment 5 are connected to the switcher 31 by output busbars B6 and B7. The secondary terminals corresponding to the respective V phases of the power converters 11 and 21 are connected to the switcher 31 by output busbars B8 and B9. The secondary terminals corresponding to the respective W phases of the power converters 11 and 21 are connected to the switcher 31 by output busbars B10 and B11.

The sensor 33 included in the power conversion device 5 includes the output current sensors CT7, CT8, and CT9 that measure values of output current of the power converter 11 or the power converter 21 and output the measured value, in addition to the configuration of the sensor 33 included in the power conversion device 3 according to Embodiment 3.

Specifically, the output current sensor CT7 measures a value of current flowing in the output busbar B6 connecting the power converter 11 to the switcher 31 or a value of current flowing in the output busbar B7 connecting the power converter 21 to the switcher 31, and outputs the measured value. The output current sensor CT8 measures a value of current flowing in the output busbar B8 connecting the power converter 11 to the switcher 31 or a value of current flowing in the output busbar B9 connecting the power converter 21 to the switcher 31, and outputs the measured value. The output current sensor CT9 measures a value of current flowing in the output busbar B10 connecting the power converter 11 to the switcher 31 or a value of current flowing in the output busbar B11 connecting the power converter 21 to the switcher 31 and outputs the measured value.

The output current sensors CT7, CT8, and CT9 operate by receiving supply of electric power from the unit controller 12 and send the measured values to the unit controller 12.

In the power conversion device 5, one of the power conversion units 10 and 20 is set as an operation-system unit and the other one is set as a standby-system unit. In other words, during operation of the power conversion device 5, current flows either in the output busbars B6, B8, and B10 or in the output busbars B7, B9, and B11. Thus the value of the output current of the power converter 11 or the value of the output current of the power converter 21 can be measured by the output current sensors CT7, CT8, and CT9 that are shared by the power conversion units 10 and 20.

With the contactor MC1 closed, the output current sensor CT7 measures a value of U-phase current output by the power converter 11 of the power conversion unit including the closed contactor MC1. Alternatively, with the contactor MC2 closed, the output current sensor CT7 measures a value of U-phase current output by the power converter 21 of the power conversion unit 20 including the closed contactor MC2.

With the contactor MC1 closed, the output current sensor CT8 measures a value of V-phase current output by the power converter 11 of the power conversion unit 10 including the closed contactor MC1. Alternatively, with the contactor MC2 closed, the output current sensor CT8 measures a value of V-phase current output by the power converter 21 of the power conversion unit 20 including the closed contactor MC2.

Figure 13:
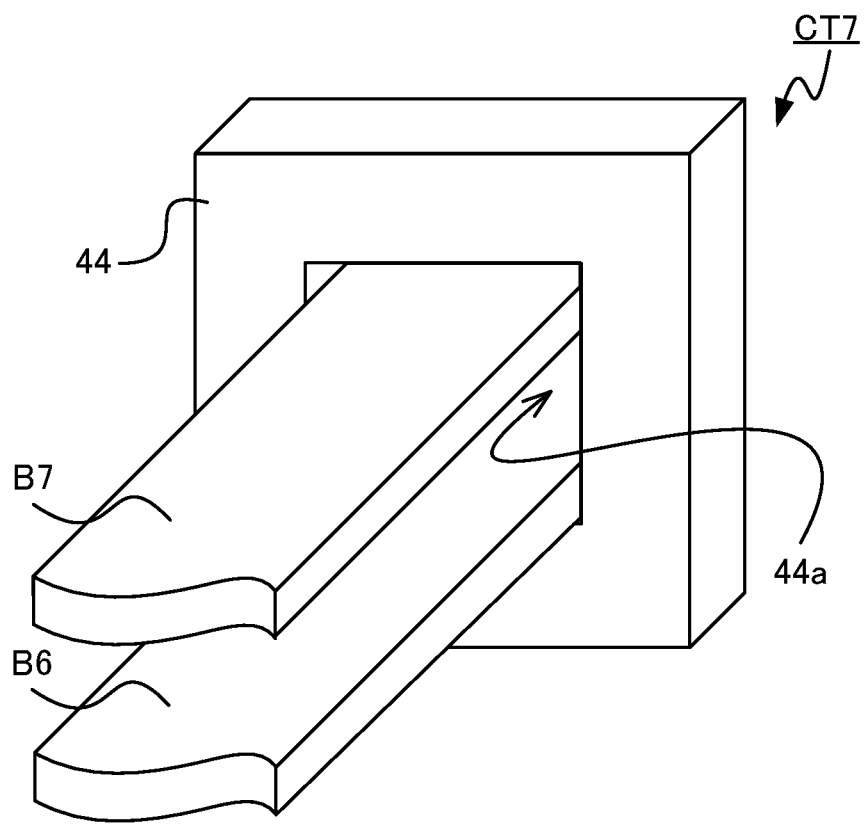
FIG. 13 is a perspective view of an output current sensor according to Embodiment 5.

With the contactor MC1 closed, the output current sensor CT9 measures a value of W-phase current output by the power converter 11 of the power conversion unit 10 including the closed contactor MC1. Alternatively, with the contactor MC2 closed, the output current sensor CT9 measures a value of W-phase current output by the power converter 21 of the power conversion unit 20 including the closed contactor MC2. Since the structures of the output current sensors CT7, CT8, and CT9 are the same, the description of just the output current sensor CT7 is given. The structure of the output current sensor CT7 is the same as that of the output current sensor CT4 according to Embodiment 4 except that, as illustrated in FIG. 13, the output busbars B6 and B7 are inserted in the through hole 44a of the second case 44 included in the output current sensor CT7.

Upon current flowing into either of the output busbars B6 or B7, the magnetic flux of the second magnetic core 45 changes. Similarly to Embodiment 4, the second measurement circuit 46 measures a value of current flowing in either of the output busbar B6 or B7 based on a change in magnetic flux of the second magnetic core 45. Then the second measurement circuit 46 sends a signal indicating a measured value to the unit controller 12 from an unillustrated output terminal.

The output current sensor CT7 having the above structure is attached to at least one of the output busbars B6 and B7 to which insulation is applied, with the output busbars B6 and B7 inserted through the through hole 44*a* in the center of the second case 44. Similarly, the output current sensor CT8 is attached to at least one of the output busbars B8 and B9 to which insulation is applied, with the output busbars B8 and B9 inserted through the through hole 44*a* in the center of the second case 44. Similarly, the output current sensor CT9 is attached to at least one of the output busbars B10 and B11 to which insulation is applied, with the output busbars B10 and B11 inserted through the through hole 44*a* in the center of the second case 44.

The unit controller 12 determines presence or absence of a failure of the power conversion unit 10 based on the values of the input current and the output current of the power converter 11 that is a control target and whether the contactor MC1 associated with the power converter 11 is in the closed state or the open state. Specifically, the presence or absence of a failure of the power conversion unit 10 is determined based on the measured value of the input current sensor CT3 and the measured values of the output current sensors CT7, CT8, and CT9 and whether the contactor MC1 is in the closed state or the open state.

Specifically, in a case where, with the contactor MC1 closed, the measured value of the input current sensor CT3 has an absolute value that is out of the first current range or at least one of amplitudes of the measured values acquired from the output current sensors CT7, CT8, and CT9 is out of the first amplitude range, the unit controller 12 determines that a failure of the power conversion unit 10 occurs.

The unit controller 12 performs A/D conversion of the measured values acquired from the output current sensors CT7, CT8, and CT9. The unit controller 12 sends via the transmission line TL1 to the unit controller 22 the text data including the determination result in step Sq1, the measured value of the input current sensor CT3, and the measured values of the output current sensors CT7, CT8, and CT9, similarly to the processing illustrated in FIG. 6. In other words, the unit controller 22 acquires via the unit controller 12 the measured value of the input current sensor CT3 and the measured values of the output current sensors CT7, CT8, and CT9.

The unit controller 22 determines presence or absence of a failure of the power conversion unit 20 based on the measured value of the input current sensor CT3 acquired from the unit controller 12 and the measured values of the output current sensors CT7, CT8, and CT9 acquired from the unit controller 12. Specifically, in a case where the contactor MC2 is in the closed state and the measured value of the input current sensor CT3 has an absolute value that is out of the first current range or at least one of amplitudes of the measured values of the output current sensors CT7, CT8, and CT9 is out of the first amplitude range, the unit controller 22 determines that the failure of the power conversion unit 20 occurs. The measured value of the input current sensor CT3 acquired by the unit controller 22 from the unit controller 12 with the contactor MC2 closed can be regarded as a value of the input current of the power converter 21. The measured values of the output current sensors CT7, CT8, and CT9 acquired by the unit controller 22 from the unit controller 12 with the contactor MC2 closed can be regarded as values of the output current of the power converter 21.

The unit controller 12 calculates an actual torque of the electric motor 53 from the measured values of the output current sensors CT7, CT8, and CT9 at the powering time of the electric railway vehicle with the filter capacitor FC1 charged. Similarly, the unit controller 22 calculates an actual torque of the electric motor 53 from the measured values of the output current sensors CT7, CT8, and CT9 acquired from the unit controller 12 at the powering time of the electric railway vehicle with the filter capacitor FC2 charged.

As described above, the sensor 33 included in the power conversion device according to Embodiment 5 includes the output current sensors CT7, CT8, and CT9 that are shared by the power conversion units 10 and 20. The configuration of the sensor 33 included in the power conversion device 5 according to Embodiment 5 is simple compared with a case of providing the current sensor in each of the output busbars B6, B7, B8, B9, B10, and B11.

Embodiments of the present disclosure are not limited to the above-described examples. The above-described circuit configuration is an example. The circuit configuration of the power conversion units 10 and 20 can be any circuit that can convert the electric power supplied from the current collector 52 into electric power for supply to the electric motor 53.

As an example, in the power conversion unit 10, a charging contactor and a charging resistor connected in series may be provided in parallel relative to the contactor MC1. Similarly, in the power conversion unit 20, a charging contactor and a charging resistor connected in series may be provided in parallel to the contactor MC2.

In this case, by closing the charging contactor included in the power conversion unit 10 with the contactor MC1 and MC2 opened at start of the power conversion devices 1 to 5, electric power is to be supplied to the filter capacitor FC1 via the charging resistor. As a result, occurrence of inrush current at charging of the filter capacitor FC1 is suppressed. Similarly in a case where the power conversion unit 20 is set as an operation-system unit, by closing the charging contactor included in the power conversion unit 20 with the contactors MC1 and MC2 opened, electric power is to be supplied to the filter capacitor FC2 via the charging resistor. As a result, occurrence of inrush current at charging of the filter capacitor FC2 is suppressed.

As another example, in the power conversion unit 10, the charging contactor may be provided in series with the contactor MC1 and the charging resistor may be provided in parallel to the charging contactor. Similarly, in the power conversion unit 20, the charging contactor may be provided in series with contactor MC2 and charging resistance.

In this case, by closing the contactor MC1 with the charging contactor opened at start of the power conversion devices 1 to 5, electric power is to be supplied to the filter capacitor FC1 via the charging resistor. As a result, occurrence of inrush current at charging of the filter capacitor FC1 is suppressed. Similarly in the case where the power conversion unit 20 is set as an operation-system unit, by closing the contactor MC2 with the charging contactor opened, electric power is to be supplied to the filter capacitor FC2 via the charging resistor. As a result, occurrence of inrush current at charging of the filter capacitor FC2 is suppressed.

The power conversion devices 1 to 5 are not limited only to power conversion devices that supply electric power to the electric motor 53 but may be any power conversion device for which redundancy is needed. The power conversion devices 1 to 5 are mountable on any vehicle, device, or the like that can supply electric power to the power conversion devices 1 to 5.

As an example, the power conversion devices 1 to 5 are mountable on an AC feeding system of electric railway vehicle. In this case, providing a transformer having a primary terminal connected to a pantograph and a converter that is connected to secondary terminals of the transformer and converts AC electric power into DC electric power, and supplying the output of the converter to the power conversion devices 1 to 5, are sufficient. As another example, the power conversion devices 1 to 5 may be mounted on an electric railway vehicle that acquires electric power via a third rail.

The number of the power conversion units is not limited to two but can be any number of three or more. For example, the power conversion devices 1 to 5 may include three power conversion units and a switcher 31 connected to each of the three power conversion units and the electric motor 53. In this case, upon supply of the operation instruction signal that provides instruction for the start of the power conversion device 1, the contactor controller 32 closes the contactor included in the power conversion unit that is set as an operation-system unit and maintains the contactors included in the other two power conversion units that are set as standby-system units in the open state. The contactor controller 32 switches the switcher 31 to connect to the operation-system unit.

Switching of the power conversion units 10 and 20 is not limited to when a failure occurs. As an example, the power conversion units 10 and 20 to operate may be switched in a determined cycle. Specifically, the contactor controller 32 may repeatedly set, in a determined cycle, the power conversion units 10 and 20 from the operation-system unit to the standby-operation unit or from the standby-system unit to the operation-system unit. This maintains the same amount of time of use of the power conversion units 10 and 20, thereby suppressing degradation of one of the power conversion units 10 and 20.

Which of the power conversion units 10 and 20 is set to be used as an operation-system unit can be freely selected. For example, the power conversion unit may be set as an operation-system unit and the power conversion unit 10 may be set as a standby-system unit. In this case, upon supply of the operation instruction signal that provides instruction for the start of the power conversion devices 1 to 5, the contactor controller 32 may close the contactor MC2 and maintain the contactor MC1 in the open state. Then the contactor controller 32 may switch the switcher 31 to connect to the operation-system unit, that is, electrically connect the secondary terminals of the power converter 21 to the electric motor 53.

Each of the power conversion units 10 and 20 may be connected to an independent electric motor 53. In this case, the power conversion devices 1 to 5 do not include the switcher 31, and connecting the secondary terminals of each of the power converters 11 and 21 to the independent electric motor 53 is sufficient.

A trigger to start the power conversion devices 1 to 5 is not limited to the operation instruction signal. As an example, the contactor controller 32 may close the contactor MC1 when the current collector 52 contacts the overhead line 51. Specifically, the contactor controller 32 may acquire a measured voltage value from a voltage measurer that measures voltage across the positive input terminal 1a and the negative input terminal 1b that corresponds to the voltage of the overhead line 51, and upon the voltage value being equal to or greater than a threshold voltage, the contactor controller 32 may close the contactor MC1. This threshold voltage may be set in consideration of a minimum value that the voltage of the overhead line 51 can have.

The power converter 11 or 21 is not limited to a VVVF inverter. As an example, the power converter 11 or 21 may be an auxiliary power source that supplies electric power to a load, such as an illumination device, air conditioner, or the like. The power converter 11 or 21 may also be a DC converter or an AC/DC converter.

The input current sensors CT1, CT2, and CT3 and the output current sensors CT4, CT5, CT6, CT7, CT8, and CT9 are not limited to a CT type of sensor. Any type of current sensor, such as a Hall element type, a Rogowskii coil type, or the like, can be used as the input current sensors CT1, CT2, and CT3 and the output current sensors CT4, CT5, CT6, CT7, CT8, and CT9.

In the above embodiments, although the contactor controller 32 is provided independently of the power conversion units 10 and 20, each of the power conversion units 10 and 20 may include the contactor controller 32. In this case, the contactor controller 32 included in the power conversion unit 10 controls the contactor MC1. Similarly, the contactor controller 32 included in the power conversion unit 20 controls the contactor MC2.

The unit controller 12 may acquire, from the contactor MC1, a state signal indicating whether the contactor MC1 is closed or opened. In this case, the unit controller 12 may determine whether the MC1 is in the closed state or the open state based on the state signal acquired from the contactor MC1. Similarly, the unit controller 22 may acquire, from the contactor MC2, a state signal indicating whether the contactor MC2 is closed or opened. In this case, the unit controller 22 may determine whether the contactor MC2 is in the closed state or the open state based on the state signal acquired from the contactor MC2.

The electric motor 53 is not limited to a three-phase induction electric motor, but rather may be a synchronous electric motor, a DC electric motor, or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4, 5 Power conversion device
1a Positive input terminal
1b Negative input terminal
10, 20 Power conversion unit
11, 21 Power converter
12, 22 Unit controller
31 Switcher
32 Contactor controller
33 Sensor
41 First case
41a, 44a Through hole
42 First magnetic core
43 First measurement circuit
44 Second case 45 Second magnetic core
46 Second measurement circuit
51 Overhead line
52 Current collector
53 Electric motor
B1, B2 Input busbar
B3, B4, B5, B6, B7, B8, B9, B10, B11 Output busbar
CT1, CT2, CT3 Input current sensor
CT4, CT5, CT6, CT7, CT8, CT9 Output current sensor
FC1, FC2 Filter capacitor
FL1, FL2 Filter reactor
MC1, MC2 Contactor
S1 Contactor control signal
S21, S22 Switching control signal
TL1 Transmission line

The invention claimed is:

1. A power conversion device, comprising:
a plurality of power conversion units each comprising power converting circuitry that converts electric power supplied from a power source into electric power for supply to a load and supplies the converted electric power to the load, a contactor that electrically connects the power converting circuitry to the power source or electrically disconnects the power converting circuitry from the power source, and unit controlling circuitry that controls switching elements included in the power converting circuitry, the plurality of power conversion units being configured to be connected in common to the power source;
contactor controlling circuitry to close or open the contactor included in each of the plurality of power conversion units; and
a sensor to measure a value of at least one of input current or output current of the power converting circuitry included in each of the plurality of power conversion units, and output the measured value of the at least one of the input current or the output current of the power converting circuitry, wherein
the unit controlling circuitry of the plurality of power conversion units are connected to one another through a transmission line, and
each of the unit controlling circuitry determines presence or absence of a failure of the power conversion unit based on the measured value of the at least one of the input current or the output current of the power converting circuitry that is a control target and whether the contactor associated with the power converting circuitry that is the control target is in a closed state or an open state, and sends a determination result to another unit controlling circuitry of the unit controlling circuitry.

2. The power conversion device according to claim 1, wherein the unit controlling circuitry included in at least one of the plurality of power conversion units acquires from the sensor the measured value of the at least one of the input current or the output current of the power converting circuitry, and sends, to the unit controlling circuitry included in the another power conversion unit, the measured value of the at least one of the input current or the output current of the power converting circuitry acquired from the sensor.

3. The power conversion device according to claim 1, wherein
the sensor includes an input current sensor that is shared by the plurality of power conversion units, and
the shared input current sensor measures a value of the input current of the power converting circuitry included in the power conversion unit with the contactor closed, and outputs the measured value of the input current of the power converting circuitry.

4. The power conversion device according to claim 3, wherein the unit controlling circuitry included in any of the plurality of power conversion units supplies electric power to the shared input current sensor, acquires the measured value of the input current from the shared input current sensor, and sends the measured value of the input current acquired from the shared input current sensor to the unit controlling circuitry included in the another power conversion unit.

5. The power conversion device according to claim 3, wherein
the shared input current sensor comprises
a first magnetic core having an annular shape,
a first measurement circuit to measure a value of the input current based on change in magnetic flux occurring in the first magnetic core, and output the measured value of the input current, and
a first case to accommodate the first magnetic core and the first measurement circuit, the first case having a through hole in a center thereof,
in each of the plurality of power conversion units, the contactor and the power converting circuitry are connected to each other by an input busbar, and
the input busbar that connects the contactor to the power converting circuitry of each of the plurality of power conversion units is inserted in the through hole of the first case.

6. The power conversion device according to claim 1, wherein the plurality of power conversion units are connected in common to the load.

7. The power conversion device according to claim 6, wherein
the sensor includes an output current sensor that is shared by the plurality of power conversion units, and
the shared output current sensor measures a value of the output current of the power converting circuitry included in the power conversion unit with the contactor closed, and outputs the measured value of the output current of the power converting circuitry.

8. The power conversion device according to claim 7, wherein the unit controlling circuitry included in any of the plurality of power conversion units supplies electric power to the shared output current sensor, acquires the measured value of the output current of the power converting circuitry from the shared output current sensor, and sends the measured value of the output current of the power converting circuitry acquired from the shared output current sensor to the unit controlling circuitry included in the another power conversion unit.

9. The power conversion device according to claim 7, wherein
the shared output current sensor comprises
a second magnetic core having an annular shape,
a second measurement circuit to measure a value of the output current based on change in magnetic flux occurring in the second magnetic core, and
a second case to accommodate the second magnetic core and the second measurement circuit, the second case having a through hole in a center thereof,
the power converting circuitry included in each of the plurality of power conversion units and the load are connected to each other by an output busbar, and the output busbar that connects the power converting circuitry of each of the plurality of power conversion units to the load is inserted in the through hole of the second case.

10. The power conversion device according to claim 1, wherein in a case where the contactor controlling circuitry closes the contactor included in any of the plurality of power conversion units, the contactor controlling circuitry maintains the contactor included in another power conversion unit in the open state.

11. The power conversion device according to claim 10, wherein
the unit controlling circuitry sends the determination result to the contactor controlling circuitry, and
in a case where the determination result acquired from the unit controlling circuitry of the power conversion unit including the closed contactor indicates that a failure of the power conversion unit occurs, the contactor controlling circuitry opens the closed contactor and closes the opened contactor included in any of the other power conversion units of the plurality of power conversion units.

12. The power conversion device according to claim 10, wherein the unit controlling circuitry included in at least one of the plurality of power conversion units acquires from the sensor the measured value of the at least one of the input current or the output current of the power converting circuitry, and sends, to the unit controlling circuitry included in the another power conversion unit, the measured value of the at least one of the input current or the output current of the power converting circuitry acquired from the sensor.

13. The power conversion device according to claim 10, wherein
the sensor includes an input current sensor that is shared by the plurality of power conversion units, and
the shared input current sensor measures a value of the input current of the power converting circuitry included in the power conversion unit with the contactor closed, and outputs the measured value of the input current of the power converting circuitry.

14. The power conversion device according to claim 13, wherein the unit controlling circuitry included in any of the plurality of power conversion units supplies electric power to the shared input current sensor, acquires the measured value of the input current from the shared input current sensor, and sends the measured value of the input current acquired from the shared input current sensor to the unit controlling circuitry included in the another power conversion unit.

15. The power conversion device according to claim 13, wherein
the shared input current sensor comprises
a first magnetic core having an annular shape,
a first measurement circuit to measure a value of the input current based on change in magnetic flux occurring in the first magnetic core, and output the measured value of the input current, and
a first case to accommodate the first magnetic core and the first measurement circuit, the first case having a through hole in a center thereof,
in each of the plurality of power conversion units, the contactor and the power converting circuitry are connected to each other by an input busbar, and
the input busbar that connects the contactor to the power converting circuitry of each of the plurality of power conversion units is inserted in the through hole of the first case.

16. The power conversion device according to claim 10, wherein the plurality of power conversion units are connected in common to the load.

17. The power conversion device according to claim 16, wherein
the sensor includes an output current sensor that is shared by the plurality of power conversion units, and
the shared output current sensor measures a value of the output current of the power converting circuitry included in the power conversion unit with the contactor closed, and outputs the measured value of the output current of the power converting circuitry.

18. The power conversion device according to claim 17, wherein the unit controlling circuitry included in any of the plurality of power conversion units supplies electric power to the shared output current sensor, acquires the measured value of the output current of the power converting circuitry from the shared output current sensor, and sends the measured value of the output current of the power converting circuitry acquired from the shared output current sensor to the unit controlling circuitry included in the another power conversion unit.

19. The power conversion device according to claim 17, wherein
the shared output current sensor comprises
a second magnetic core having an annular shape,
a second measurement circuit to measure a value of the output current based on change in magnetic flux occurring in the second magnetic core, and
a second case to accommodate the second magnetic core and the second measurement circuit, the second case having a through hole in a center thereof,
the power converting circuitry included in each of the plurality of power conversion units and the load are connected to each other by an output busbar, and
the output busbar that connects the power converting circuitry of each of the plurality of power conversion units to the load is inserted in the through hole of the second case.

* * * * *